United States Patent
Soroush et al.

(10) Patent No.: US 11,025,661 B2
(45) Date of Patent: Jun. 1, 2021

(54) METHOD FOR IMPROVING THE SECURITY OF A NETWORKED SYSTEM BY ADJUSTING THE CONFIGURATION PARAMETERS OF THE SYSTEM COMPONENTS

(71) Applicant: Palo Alto Research Center Incorporated, Palo Alto, CA (US)

(72) Inventors: Hamed Soroush, San Jose, CA (US); Shantanu Rane, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 321 days.

(21) Appl. No.: 16/219,774

(22) Filed: Dec. 13, 2018

(65) Prior Publication Data

US 2020/0053116 A1 Feb. 13, 2020

Related U.S. Application Data

(60) Provisional application No. 62/718,328, filed on Aug. 13, 2018.

(51) Int. Cl.
*H04L 29/06* (2006.01)
*H04L 12/24* (2006.01)
*H04L 12/26* (2006.01)

(52) U.S. Cl.
CPC ...... *H04L 63/1433* (2013.01); *H04L 41/0816* (2013.01); *H04L 41/0823* (2013.01);
(Continued)

(58) Field of Classification Search
CPC . H04L 63/1433; H04L 63/20; H04L 41/0816; H04L 41/0823; H04L 43/045
See application file for complete search history.

(56) References Cited

U.S. PATENT DOCUMENTS 9,684,865 B1 * 6/2017 Ezick .................... G06N 5/003
9,705,978 B1 * 7/2017 Kenigsberg ........... H04L 43/045
(Continued)

OTHER PUBLICATIONS

Natarajan et al., "NSDMiner: Automated Discovery of Network Service Dependencies", pp. 2507-2515 (Year: 2012).*
(Continued)

*Primary Examiner* — Hee K Song
(74) *Attorney, Agent, or Firm* — Shun Yao; Park, Vaughan, Fleming & Dowler LLP

(57) ABSTRACT

One embodiment provides a method for facilitating security in a system of networked components. During operation, the system constructs a configuration graph that stores a first set of relationships between configuration parameters within a component and a second set of relationships between configuration parameters across different components. A relationship corresponds to a constraint and is indicated by one or more of: a range for a configuration parameter; and a conjunction or a disjunction of logical relationships between two or more configuration parameters. The system generates a set of candidate configuration parameter values that satisfy the constraints of the relationships in the configuration graph. The system selects, from the set of candidate configuration parameter values, a first set of configuration parameter values that optimizes a security objective function.

18 Claims, 14 Drawing Sheets
(8 of 14 Drawing Sheet(s) Filed in Color)

(52) U.S. Cl.
CPC ............ *H04L 41/22* (2013.01); *H04L 43/045* (2013.01); *H04L 63/20* (2013.01)

(56) References Cited

U.S. PATENT DOCUMENTS

| | | | | |
|---|---|---|---|---|
| 2008/0172716 | A1* | 7/2008 | Talpade | H04L 41/0869 726/1 |
| 2010/0192195 | A1* | 7/2010 | Dunagan | G06F 21/577 726/1 |
| 2018/0210927 | A1* | 7/2018 | Karam | G06F 16/248 |

OTHER PUBLICATIONS

Albanese et al., "A Graphical Model to Access the Impact of Multi-Step Attacks", JDMS 2018 Vo. 15(1) 79-93 (Year: 2018).*
Albanese, M., & Jajodia, S. (2017). A Graphical Model to Assess the Impact of Multi-Step Attacks. The Journal of Defense Modeling and Simulation.
Albanese, M., Pugliese, A., & Subrahmanian, V. (2013). Fast Activity Detection: Indexing for Temporal Stochastic Automaton-Based Activity Models. IEEE Transactions on Knowledge and Data Engineering, 360-373.
Bahl, P., Barham, P., & Black, R. (2006). Discovering Dependencies for Network Management. ACM HotNets.
BeyondTrust. (2018). Retina. Retrieved from Retina: https://www.beyondtrust.com/products/retina-network-security-scanner/.
CyVision. (2018). CyVision. Retrieved from CyVision: https://www.cyvisiontechnologies.com/.
GraphX. (2018). GraphX. Retrieved from GraphX: https://spark.apache.org/graphx/.
Leversage, D., & Byres, E. (2008). Estimating a system's mean time-to-compromise. IEEE Security & Privacy, 52-60.
Mitre. (2018). CVE. Retrieved from CVE: https://cve.mitre.org/.
MSR. (2018). Z3 Guide. Retrieved from Z3 Guide: https://rise4fun.com/z3/tutorialcontent/guide#h23.
Natarajan, A., Ning, P., Liu, Y., Jajodia, S., & Hutchinson, S. (2012). NSDMiner: Automated Discovery of Network Service Dependencies. IEEE INFOCOM.
NIST. (2018). Retrieved form https://nvd.nist.gov/.
OMG. (Mar. 2015). Data Distribution Service Specification Version 1.4. Retrieved from OMG DDS: https://www.omg.org/spec/DDS/About-DDS/.
RTI. (2017). RTI Routing Service. Retrieved from RTI Routing Service: https://rti.com/products/dds/routing-service.html.
SANS. (2002). SANS Institute, "Quantitative Risk Analysis Step-By-Step". Retrieved from Quantitative Risk Analysis Step-by-Step: https://www.sans.org/reading-room/whitepapers/auditing/quantitative-risk-analysis-step-by-step-849.
Schrecker, S., Soroush, H., & Molina, J. (2016). "Industrial Internet of Things vol. G4: Security Framework",. CreateSpace Independent Publishing Platform.
Soroush, H., Irey, P., & Pardo-Castellote, G. (2015). Next-Generation Cybersecurity for Advanced Real-Time Distributed Systems. Intelligent Ships Symposium.
StackOverflow. (2018). StackOverflow. Retrieved from StackOverflow: https://stackflow.com/.
Tenable. (2018). Nessus. Retrieved from Nessus: https://www.tenable.com/products/nessus/nessus-professional.
Venkatesan, S., Albanese, M., & Jajodia, S. (2015). Distributing Stealthy Botnets through Strategic Placement of Detectors. IEEE Conference on Communications and Network Security (IEEE CNS).
Venkatesan, S., Albanese, M., Cybenko, G., & Jajodia, S. (2016). A Moving Target Defense Approach to Disrupting Stealthy Botnets. ACM Workshop on Moving Target Defense (MTD).
Welsh, M. (2013). What I Wish System Researchers Would Work On. Retrieved from http://matt-welsh.blogspot.com/2013/05/what-i-wish-systems-researchers-would.html.
Xu, Tu., & Zhou, Y. (2015). Systems Approaches to Tackling Configuration Errors: A Survey. ACM Comput. Surv.

* cited by examiner

METHOD FOR IMPROVING THE SECURITY OF A NETWORKED SYSTEM BY ADJUSTING THE CONFIGURATION PARAMETERS OF THE SYSTEM COMPONENTS

RELATED APPLICATION

This application claims the benefit of U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018, the disclosure of which is incorporated herein by reference in its entirety

STATEMENT OF GOVERNMENT-FUNDED RESEARCH

This invention was made with U.S. government support under (Contract Number) Award Number: FA8750-18-2-0147 awarded by the Defense Advanced Research Projects Agency (DARPA) of the Department of Defense (DoD). The U.S. government has certain rights in the invention.

BACKGROUND

Field

This disclosure is generally related to improving security in a networked system. More this disclosure is related to method for improving the security of a networked system by adjusting the configuration parameters of the system components.

Related Art

Networked systems are growing in scale and usage. These networked systems may have a significant number of interconnected components. Providing the appropriate level of security for such networked systems may pose a challenge. For example, a majority of the security compromises in Internet of Thing (IoT) systems has been attributed to mis-configurations, i.e., combinations of configuration parameters of the individual system components that expose vulnerabilities to an adversary.

Conventional security solutions focus narrowly on the configuration parameters of the individual system components. These solutions do not leverage the complex relationships among the configuration parameters of the individual system components. For example, in a mission-critical IoT system, these solutions do not account for the dependencies among the configuration parameters of the interconnected system components or devices. Furthermore, the conventional solutions do not provide a principled approach to account for the effect of configuration parameters on the attack sequences that are available to an adversary, nor do they provide functional dependencies between the interconnected system components or devices.

Thus, while current solutions consider configuration parameters of individual system components in a networked system, there is a need to improve the security of the networked system by accounting for the relationships among the individual system components, and also accounting for the dependencies and attack sequences associated with the individual system components.

SUMMARY

One embodiment provides a method for facilitating security in a system of networked components. During operation, the system constructs a configuration graph that stores a first set of relationships between configuration parameters within a component and a second set of relationships between configuration parameters across different components. A relationship corresponds to a constraint and is indicated by one or more of: a range for a configuration parameter; and a conjunction or a disjunction of logical relationships between two or more configuration parameters. The system generates a set of candidate configuration parameter values that satisfy the constraints of the relationships in the configuration graph. The system selects, from the set of candidate configuration parameter values, a first set of configuration parameter values that optimizes a security objective function.

In some embodiments, the security objective function comprises reducing a size of an attack surface of the system of networked components.

In some embodiments, the security objective function comprises reducing an amount of damage caused by a sequence of attacks that exploit vulnerabilities in the components, wherein the vulnerabilities are induced by a respective set of candidate configuration parameter values.

In some embodiments, generating the set of candidate configuration parameter values is based on one or more of: a Satisfiability (SAT) Solver; and a Satisfiability Modulo Theory (SMT) Solver.

In some embodiments, the configuration graph includes a plurality of nodes, including a first class of nodes and a second class of nodes. A node in the first class indicates a value for a configuration parameter for a first component, and a node in the second class indicates a relationship between configuration parameters, including the within-component configuration parameters of the first set of relationships and the across-component configuration parameters of the second set of relationships.

In some embodiments, the system constructs a dependency graph that stores a third set of relationships which indicate functional dependencies and interactions between the components of the system, wherein the third set of relationships imposes constraints on the first set of within-component relationships and the second set of across-component relationships of the configuration graph.

In some embodiments, the system constructs a vulnerability graph that stores dependencies between vulnerabilities associated with the components, wherein the vulnerabilities are exploited based on the first set of within-component relationships and the second set of across-component relationships of the configuration graph, wherein satisfying the relationship between the configuration parameters in the node in the second class of nodes in the configuration graph results in satisfying a precondition for a vulnerability in the vulnerability graph, and wherein each set of candidate configuration parameter values induces constructing a specific vulnerability graph.

In some embodiments, the vulnerability graph and the dependency graph are generated based on one or more of: a manual generation involving a user; and an automatic generation based on software tools which scan the components during operation.

In some embodiments, the system solves an optimization problem by using the configuration graph together with the dependency graph and the vulnerability graph. The system removes or disables, in a first order, unused dependencies associated with the third set of relationships in the dependency graph.

In some embodiments, the system receives, from a computing device associated with a user, a request to obtain an optimal set of configuration parameter values for the components, wherein the request includes user-configured data, wherein constructing the configuration graph, generating the set of candidate configuration parameter values, and selecting the first set of configuration parameters are in response to receiving the request. The system returns, to the computing device associated with the user, the selected first set of configuration parameter values. The system displays, on a display of the computing device associated with the user, one or more of: a visual representation of a multi-layer graph using the first set of configuration parameter values, wherein the multi-layer graph comprises the configuration graph, a dependency graph, and a vulnerability graph; the selected first set of configuration parameter values; a visualization of the selected first set of configuration parameter values; a graphical user interface which allows the user to adjust or change any of the selected first set of configuration parameter values; and an explanation of the selected first set of configuration parameter values, including a textual reason for why the selected first set of configuration parameter values solves an optimization problem created by the request.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

Figure 1:
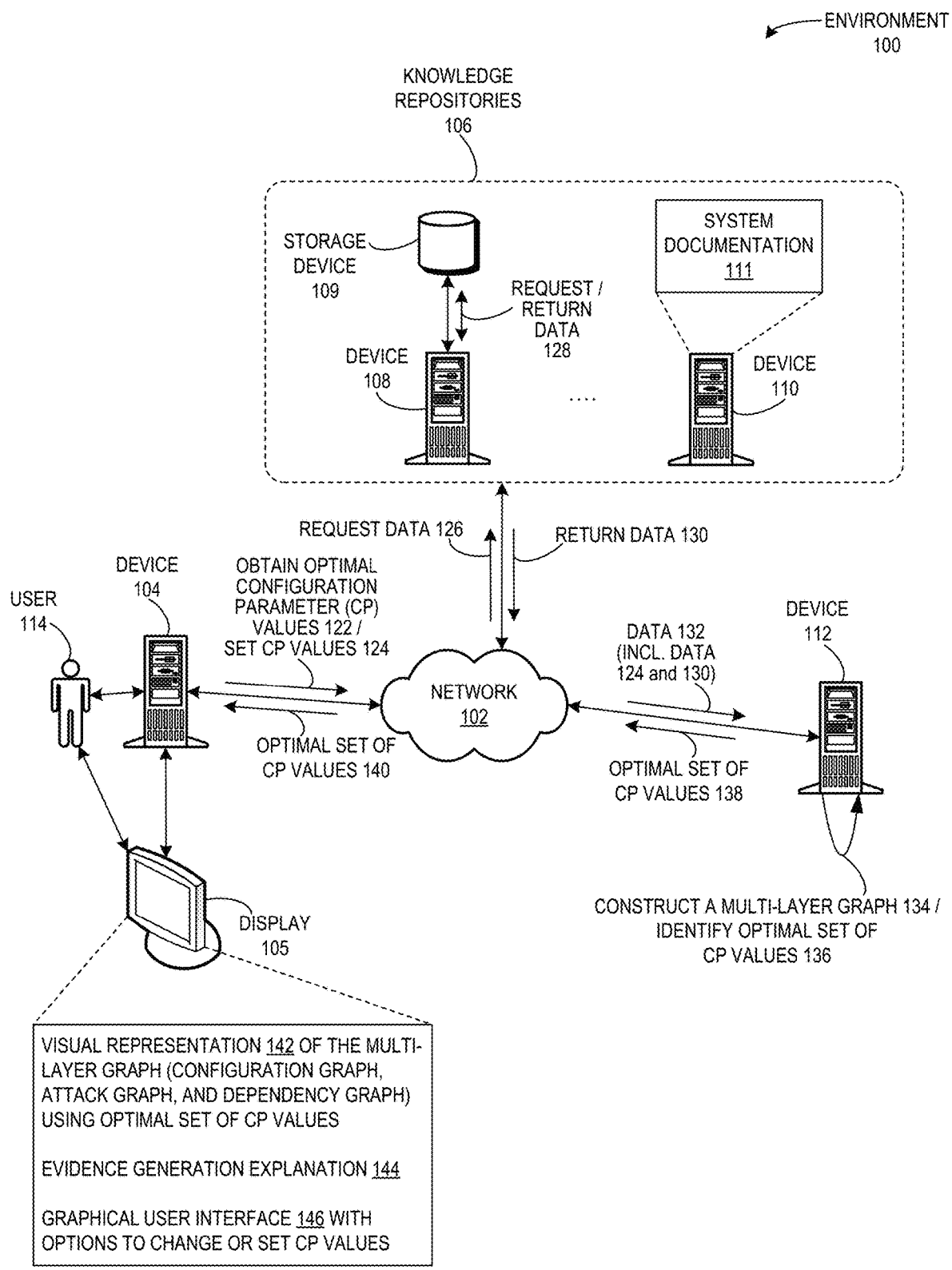
FIG. 1 illustrates an exemplary environment for facilitating security in a system of networked components, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of improving the security of a networked system (with multiple individual components) by adjusting and optimizing the configuration parameters both within an individual component ("within-component configuration parameters") and across multiple components ("across-component configuration parameters").

As described above, providing the appropriate level of security for networked systems with a vast number of interconnected components may pose a challenge. A majority of the security compromises in Internet of Thing (IoT) systems has been attributed to mis-configurations, i.e., combinations of configuration parameters of the individual system components that expose vulnerabilities to an adversary. Conventional security solutions focus narrowly on the configuration parameters of the individual system components. These solutions do not leverage the complex relationships among the configuration parameters of the individual system components. For example, in a mission-critical IoT system, these solutions do not account for the dependencies among the configuration parameters of the interconnected system components or devices. Furthermore, the conventional solutions do not provide a principled approach to account for the effect of configuration parameters on the attack sequences that are available to an adversary, nor do they provide functional dependencies between the interconnected system components or devices.

Thus, while current solutions consider configuration parameters of individual system components in a networked system, there is a need to improve the security of the networked system by accounting for the relationships among the individual system components, and also accounting for the dependencies and attack sequences associated with the individual system components.

The embodiments described herein address these challenges by providing a system based on a Secure Configurations for the IoT Based on Optimization and Reasoning on Graphs (SCIBORG) scheme. The system generates a multi-layer graph which includes an attack subgraph, a dependency subgraph, and a configuration subgraph. Using these three subgraphs (and the various dependencies and relationships both within and across the components), the system can provide an optimal set of configuration parameter values. Determining this optimal set of configuration parameter values can be based on achieving a particular security objective function, such as reducing the size of the attack surface of the overall network, or serving a particular operational context.

The embodiments of the system described herein provide enhancements and improvements in the area of compositional security analysis via three key innovative contributions. First, the composed system is modeled using a multi-layer graph comprising: a dependency subgraph that captures the functional relationships among system components; a configuration subgraph that accounts for the relationships among configuration parameters within and across system components; and an attack subgraph containing the vulnerabilities induced by a given configuration and their dependencies in so far as they enable multi-step attacks. Characterization of the impact of potential multi-step attacks due to configuration settings is a significant and novel aspect of the system. Any approach that focuses solely on minimizing the attack surface fails to capture the intricate relationships between the configuration parameters, the attack paths available to an adversary, and the functional dependencies among the system components. Such approaches may fail to reduce the risk associated with residual vulnerabilities. In particular, such approaches may fall short in addressing configuration security issues in systems with very long lifespans (which can be at least in the order of decades for critical infrastructure). A high-level overview of the multi-layer system comprising the three subgraphs is described below in relation to FIGS. 2 and 8, while a detailed overview is described below in relation to FIGS. 5 and 6.

Second, the described embodiments establish algorithms and utilize software tools to analyze these three subgraphs jointly in order to reason about the impact of a set of candidate configuration parameter values on the security and functionality of the composed system.

Third, the described embodiments use a Satisfiability Modulo Theory (SMT) solver to express the complex relationships among the configuration parameters as constraints in a security optimization problem. SMT solvers have not been previously employed for enhancing configuration security in a networked system.

Thus, the embodiments described herein provide a technological solution (generating a configuration graph which stores relationships between both within-component and across-component configuration parameters) to a technological problem (improving the security of networked system with a large number of interconnected components). Furthermore, in the described embodiments of the system, a user (e.g., a power user or a system operator) may interact with the system in several ways. The user can provide user input on setting the configuration parameter values, and can also adjust the constraints between various components. Additional improvements and enhancements provided by the described embodiments are detailed below in the section titled "Summary of Improvement and Enhancements Provided by the Described Embodiments."

A storage device can store a graph, which can include a data set comprising a plurality of data elements. A data element can correspond to a node or a vertex in the graph. The terms "node" and "vertex" are used interchangeably in this disclosure. An edge between a first node and a second node represents a type and/or strength of the relationship between the first node and the second node. A detailed description of the various nodes and edges (both within and between, or among, the three subgraphs) is provided below in relation to FIGS. 2, 5, and 6, where the three subgraphs include the attack, dependency, and configuration subgraphs of the multi-layer composed system graph of the embodiments described herein.

High-Level Overview of Configuration Graph

Given a system of networked components, the embodiments described herein construct a configuration graph based on the set of configuration parameters associated with each system component. The configuration graph can encode the relationships between configuration parameters within each component, and can also encode the relationships between configuration parameters across different components. These relationships can correspond to constraints and can be indicated by a range (or interval of values) for a configuration parameter, or by a conjunction and disjunction of a respective logical relationship.

Any given set of configuration parameters activates some of the constraint relationships and deactivates some others. This activation and deactivation pattern precisely determines the set of attacks that can be carried out on the system components. In other words, the pattern determines the attack surface. The pattern also determines the sequence of attacks that an attacker must carry out in order to achieve his target goal of compromising a particular system component. For some components, such an attack sequence (or attack path) may not exist, thus rendering the component safe from attack. For some other components, multiple attack paths may exist, each with differing difficulty. The goal of the system (or a user or a system administrator or a power user) is to determine a collection of values of configuration parameters that minimizes the attack surface.

Because the configuration graph encodes the relationships between within-component and across-component configuration parameters, additional information is required in order to build this graph, including the functional dependencies amongst the system components. Specifically, if a first component depends on a second component, then it is likely that the values of the configuration parameters of the second component are determined by the values of the configuration parameters of the first component.

The system can measure the suitability of a set of configuration parameter values in a number of ways. One approach is to measure the attack surface, namely the set of resources (e.g., entry points, exit points, channels, and untrusted data items) that can be used to attack the system by injecting or extracting data. The size of the attack surface is the number of resources in this set. Thus, the most suitable configuration can be found by an optimization problem that discovers the set of configuration parameter values that minimizes the configuration set.

A second approach is to quantify the impact of exploitable vulnerabilities in one or more system components. This damage depends on the sequence of attacks that take advantage of the vulnerabilities in various system components, with the goal of compromising the functionality of the system under test. In this case, the cost of configuration is not simply the size of the attack surface, but the damage inflicted by a hypothetical attack sequence that is allowed by the chosen set of configuration parameter values.

Exemplary Environment and Communication

FIG. 1 illustrates an exemplary environment for facilitating security in a system of networked components, in accordance with an embodiment of the present application. Environment 100 can include: a device 104, an associated user 114, and an associated display 105; knowledge repositories 106; and a device 112. Devices 104, 106, and 112 can communicate with each other via a network 102. Knowledge repositories 106 can include multiple devices, databases, or sources, such as a device 108 with an associated storage device 109, and a device 110 with system documentation 111. Device 112 can be a server, a computing device, or any device which can perform the functions described herein.

During operation, user 114 can initiate a request to obtain an optimal set of configuration parameter values (via a communication or request 122). User 114 can include information in request 122 that specifies an operational context (e.g., whether a ship is in an active combat zone, dry-docked, "mothballed," or in a reserve fleet (partially or fully decommissioned), etc.). User 114 can also set certain configuration parameter values (via a communication 124, which can be transmitted along with request 122). Request 122 can be sent to knowledge repositories 106 as part of a request data 126 and a return data 130 communication. For example, knowledge repositories 106 can receive request data 126. Device 108 can retrieve data from storage device 109 (via a request/return data 128 communication), and device 110 can return a relevant portion of system documentation 111, which combined data can be subsequently returned via the return data 130 communication. The combined data of return data 130 can be retrieved based on request 122 from user 114, where user-configured data 124 can indicate the operational context and other configuration parameter values which dictate what information is to be retrieved from knowledge repositories 106.

The system can send data 132 (which can include request 122, data 124, data 130) to device 112. Device 112 can construct a multi-layer graph (function 134), which multi-layer graph comprises three subgraphs, including: an attack graph; a dependency graph; and a configuration graph, as described below in relation to FIG. 2 (high-level) and FIGS. 5 and 6 (detailed). Device 112 can further identify an optimal set of configuration parameter values (function 136), and return optimal set of configuration parameter values 138 back to device 104. Device 104 can receive values 138 (as an optimal set of configuration parameter values 140). Device 104 can also display, via display 105, various information to user 114, including: a visual representation 142 of the multi-layer graph (including the attack graph, the dependency graph, and the configuration graph) using the optimal set of configuration parameter values 142; an evidence generation explanation 144; and a graphical user interface 146 with options to change or set the configuration parameter values.

High-Level Diagram of Multi-Layer Composed System Graph

Figure 2:
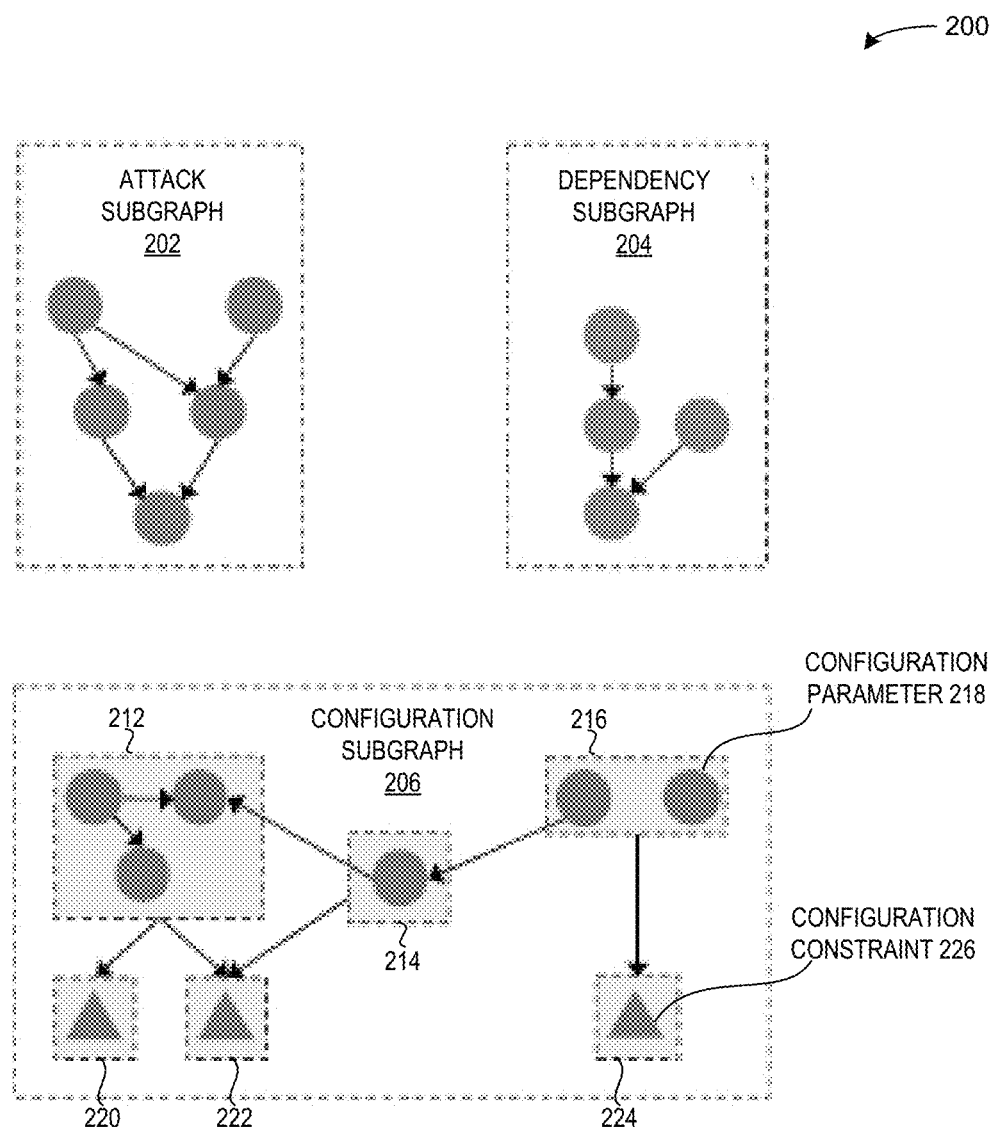
FIG. 2 illustrates a high-level exemplary diagram of a multi-layer composed system graph, in accordance with an embodiment of the present application.

FIG. 2 illustrates a high-level exemplary diagram 200 of a multi-layer composed system graph, in accordance with an embodiment of the present application. Diagram 200 includes: an attack subgraph 202, with each vulnerability node depicted as a red-colored circle, and relationships between vulnerability nodes depicted as black arrows; a dependency subgraph 204, with each component node depicted as a blue-colored circle, and relationships between component nodes depicted as black arrows; and a configuration subgraph 206, with configuration parameters depicted as green-colored circles and configuration constraints depicted as green-colored triangles.

Configuration subgraph 206 includes two types of nodes or vertices, as described further below in relation to FIGS. 5 and 6. "Class 1" vertices capture per-component configuration parameters, e.g., the green-colored circles in boxes 212, 214, and 216. For example, box 216 includes a configuration parameter 218, which is a Class 1 vertex. "Class 2" vertices capture relationships among (or conditions on) the configuration parameters, e.g., the green-colored triangles in boxes 220, 222, and 224. For example, box 224 includes a configuration constraint 226, which is a Class 2 vertex.

In configuration subgraph 206, relationships within and across components are depicted as black arrows between the green-colored circles, while constraints between and among the components are depicted as black arrows between the Class 1 boxes and the Class 2 boxes. An exemplary diagram of a detailed multi-layer composed system is described below in relation to FIGS. 5 and 6.

Exemplary Architecture and Improvements to Current Solutions

Figure 3A:
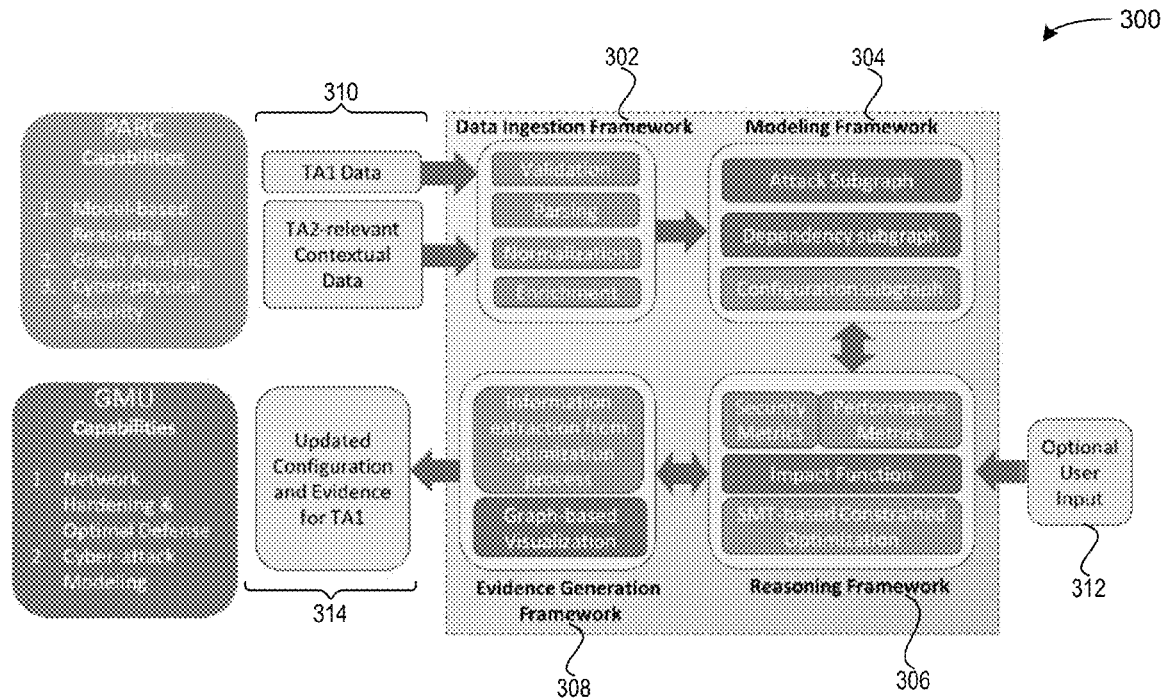
FIG. 3A illustrates an exemplary architecture, including four distinct frameworks, in accordance with an embodiment of the present application.

FIG. 3A illustrates an exemplary architecture 300, including four distinct frameworks, in accordance with an embodiment of the present application. Architecture 300 includes a Data Ingestion Framework 302, a Modeling Framework 304, a Reasoning Framework 306, and an Evidence Generation Framework 308. Data Ingestion Framework 302 ingests TA1 data including functional models, formal representations of component documentation, Standard Operational Procedures (SOPs), and configuration-to-functionality mappings. Data Ingestion Framework 302 can also identify and ingest relevant contextual data such as network topology, reports from vulnerability scanners, relevant threat intelligence feeds, and critical mission dependencies. Thus, Data Ingestion Framework 302 can validate, parse, normalize, and enrich data received from TA1 performers as well as relevant contextual data deemed necessary for execution of TA2 (i.e., input data 310).

Modeling Framework 304 generates a composed system graph that efficiently captures information about the attack surface (and vulnerability dependencies), component dependencies, and configuration parameter relationships within and across components. An exemplary Modeling Framework is described below in relation to FIGS. 5 and 6, in the section titled "Detailed Exemplary Diagrams of a Multi-Layer Composed System Graph (Modeling Framework)." The composed system graph can be a multi-layer graph which merges three types of subgraphs, as depicted generally above in relation to FIG. 2 and specifically below in relation to FIGS. 5 and 6: (1) a dependency subgraph that captures functional dependencies amongst the components;

(2) a vulnerability subgraph that captures the dependencies between vulnerabilities; and (3) a configuration subgraph that captures within-component and across-component configuration dependencies.

Reasoning Framework 306 uses an approach based on a Satisfiability Modulo Theory (SMT) solver along with the composed system graph to find a configuration set that minimizes the impact of multi-step attacks—which includes, but is not limited to, reduction of the attack surface—while preserving the functionality of the target system. The user can provide optional user input 312 to Reasoning Framework 306. Reasoning Framework 306 can establish security metrics (e.g., the probability of compromise) and performance metrics (e.g., availability, throughput, etc.), and devise a cost function based on these metrics. An exemplary method of solving the optimization problem (e.g., of finding a set of configuration parameters that both reduces the attack surface and preserves the functionality of the system) is described below in the section titled "Solving the Optimization Problem (Reasoning Framework)."

Finally, Evidence Generation Framework 308 automatically generates human-readable evidence and visualizations supporting the selected configuration set (i.e., output data 314). Evidence Generation Framework 308 can translate low-level queries used to derive the optimized configuration parameters into high-level human language. A discussion of user interactions with the system, including explanations for a recommended set of configuration parameters as well as graphical user interface options for adjusting configuration parameters, is described below in the section titled "Providing Human-Understandable Insights re: Optimal Configuration Parameters (Evidence Generation Framework)."

The typical metric used to measure the vulnerability of the composed system is referred to as the "attack surface," which is the set of resources (e.g., entry points, exit points, channels, and untrusted data items) that can be used to attack the system by injecting or extracting data. The size of the attack surface is the number of resources in this set. The size of the attack surface is a necessary, but not sufficient metric for evaluating the security of the composed system, because: (1) it assumes that all resources are equally difficult to attack; (2) it ignores real-world attacks in which the adversary proceeds sequentially, compromising one resource after another to achieve a specific goal; and (3) it ignores functional dependencies among the components of the composed system. Any approach that focuses solely on minimizing the attack surface will fail to capture the intricate relationships between the configuration parameters, the attack paths available to an adversary, and the functional dependencies among the system's components.

Therefore, a more sophisticated metric for security is required to evaluate the embodiments of the system described herein. This metric is referred to as the "configuration impact." This configuration impact metric measures the potential damage inflicted on the composed system by a given configuration set, by taking into account the different attack sequences (i.e., attack paths) induced by that configuration set as well as the functional dependencies among the system's components.

Figure 3B:
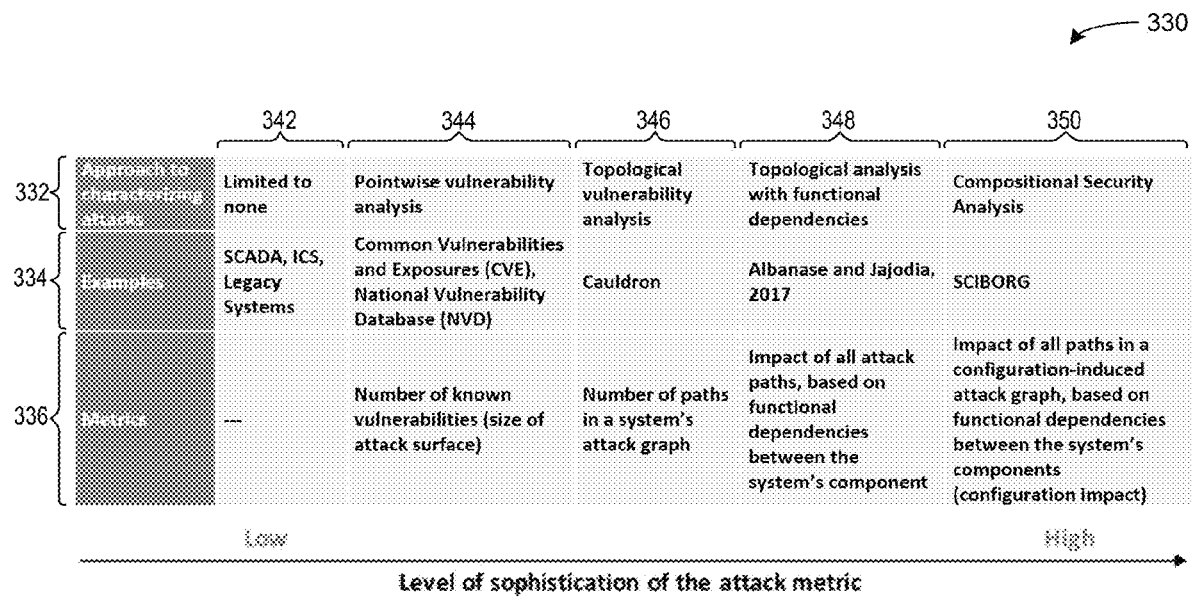
FIG. 3B illustrates an exemplary table indicating how the embodiments of the present application provide an improvement based on the configuration impact, in accordance with an embodiment of the present application.

FIG. 3B indicates how the configuration impact metric significantly extends the metrics previously used in the state of the art, and illustrates an exemplary table 330 indicating how the embodiments of the present application provide an improvement based on the configuration impact, in accordance with an embodiment of the present application. Table 330 can include: a row 332 indicating an "Approach to characterizing attacks"; a row 334 with "Examples" of a specific approach; and a row 336 with "Metrics" for the specific approach. Table 330 is arranged with columns depicting an increasing level of sophistication from left to right. For example, column 344 (near left) describes the approach of "Pointwise vulnerability analysis," and lists as examples "Common Vulnerabilities and Exposures (CVE), National Vulnerability Database (NVD)," and further lists the metrics as the "number of known vulnerabilities (size of the attack surface)." In contrast, column 350 (far right) describes the approach of the SCIBORG scheme of the present application, including the approach of "Compositional Security Analysis," with SCIBORG as the example, using the new metrics of "Impact of all paths in a configuration-induced attack graph, based on functional dependencies between the system's components (configuration impact)." Thus, table 330 demonstrates how the described embodiments provide an enhancement or improvement to the current state of the art, based on the new metric, by providing the highest level of sophistication of the attack metric, and by considering the relationships between and among configuration parameters of components, as well as by considering the attack surface (e.g., via the attack or vulnerability subgraph) and the functional dependencies (e.g., via the dependency subgraph).

This new metric—the configuration impact—can be defined as: Configuration Space Coverage %=No. of configuration sets examined/Total no. of possible configuration sets×100. For the entire composed system that can have hundreds or thousands of devices, each with its own configuration parameters, the total number of possible configuration sets can be extremely large. It is impractical to examine the impact of each possible configuration set on the security and functionality of the composed system. The graph-based approach of the embodiments described herein allows the system to reduce the number of configuration sets to be examined by identifying functional configuration settings (utilizing the dependency subgraph) and removing or disabling unused functionalities (by reasoning on the combined configuration and dependency subgraphs).

The embodiments described herein (e.g., based on the SCIBORG scheme) are designed to be general enough to apply to a variety of composed systems, including home-based IoT systems, building automation, Industrial IoT (e.g., ICS/SCADA), and DoD platforms (e.g., AEGIS).

Figure 4:
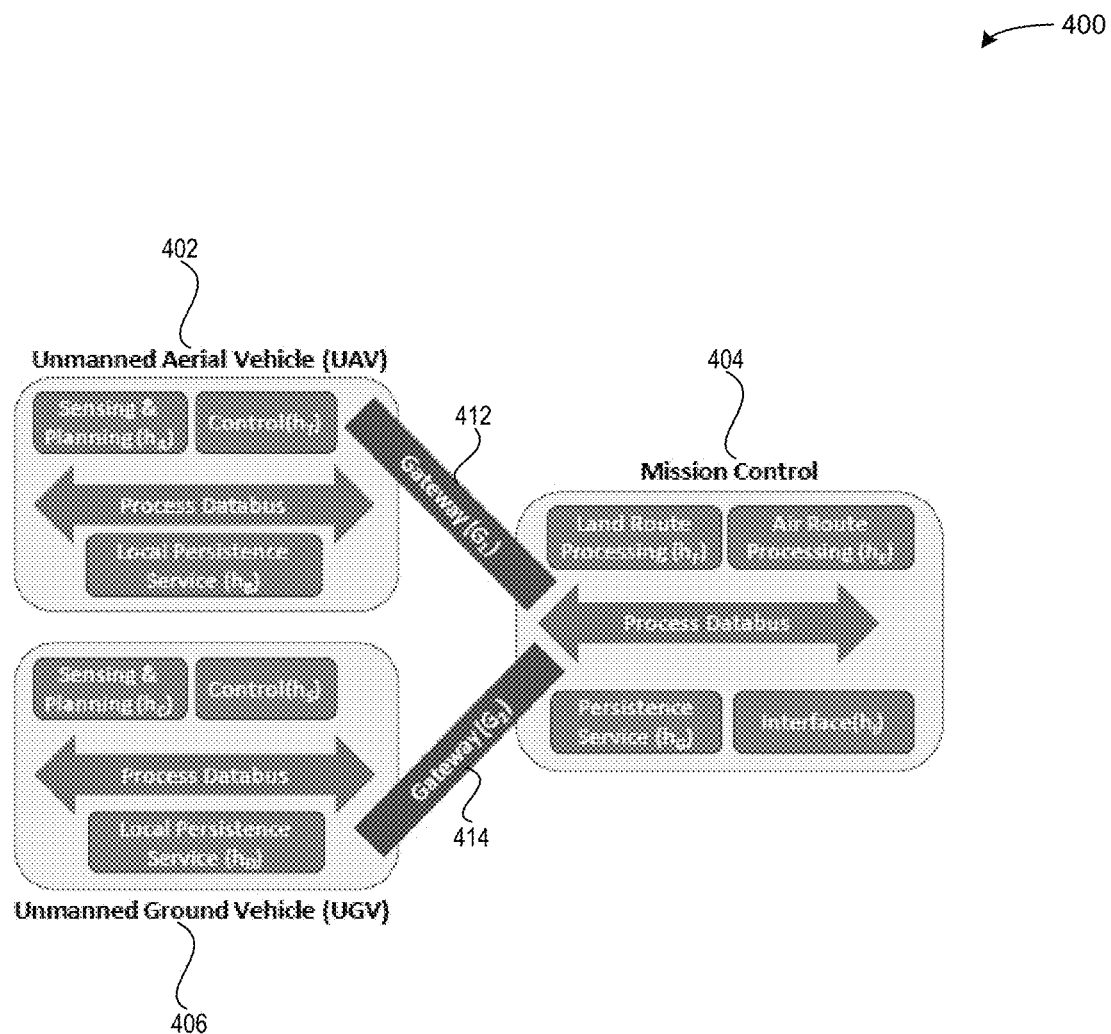
FIG. 4 illustrates an exemplary system 400 of networked components, which describes the technical approach through a concrete example, including an Unmanned Aerial Vehicle, an Unmanned Ground Vehicle, and a backend Mission Control Station, in accordance with an embodiment of the present application.

FIG. 4 illustrates an exemplary system 400 of networked components, which describes the technical approach through a concrete example, including an Unmanned Aerial Vehicle (UAV) 402, an Unmanned Ground Vehicle (UGV) 406, and a backend Mission Control Station 404, in accordance with an embodiment of the present application.

While system 400 is intentionally simplified, the example of system 400 is aligned with existing and proposed architectures for defense and Industrial IoT applications. Internal to each high-level component of the architecture (i.e., UAV, UGV, and Mission Control Station) is a publish-subscribe databus (e.g., one provided by Data Distribution Service (DDS) widely used in DoD systems). Individual system subcomponents (e.g., Sensing & Planning Modules) publish and/or subscribe to relevant data streams (i.e., Topics). Persistence services act as smart application-level caches—implemented on top of a relational database—that store data and deliver it to late-joiner entities on the corresponding databus. Application-level gateways (e.g., Real-Time Innovations DDS Routing Service) G1 412 and G2 414 bridge field databuses to the mission databus. The mission control interface module can be a web application that communicates with the central database of mission control unit's persistence service to analyze historical data received by local persistence services on the UAV and the UGV. During the mission, the UAV requires both land and air route processing information coming from the mission control unit, while the UGV requires only the land route processing information to operate.

Detailed Exemplary Diagrams of a Multi-Layer Composed System Graph (Modeling Framework)

Figure 5:
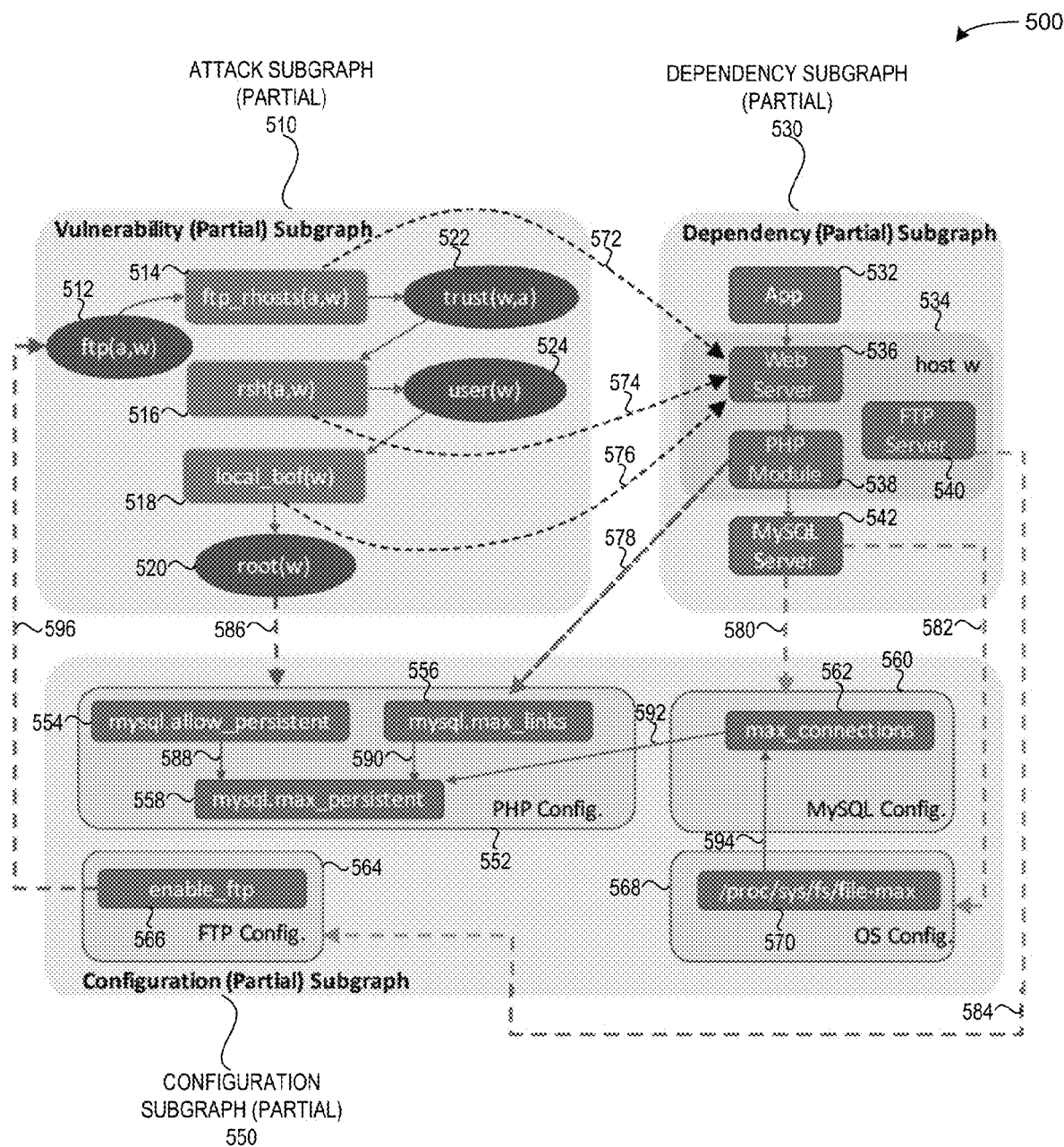
FIG. 5 illustrates an exemplary diagram of a multi-layer composed system graph, including relationships between within-component and across-component configuration parameters of individual components represented in an attack subgraph (partial), a dependency subgraph (partial), and a configuration subgraph (partial), in accordance with an embodiment of the present application.

FIG. 5 illustrates an exemplary diagram 500 of a multi-layer composed system graph, including relationships between within-component and across-component configuration parameters of individual components represented in an attack subgraph (partial) 510, a dependency subgraph (partial) 530, and a configuration subgraph (partial) 550, in accordance with an embodiment of the present application. Attack subgraph 510 (also referred to as a vulnerability subgraph) can include purple-colored ovals, which represent pre-conditions which must be met in order for the vulnerability to exist, and green-colored rectangles, which represent the actual vulnerabilities themselves. The blue-colored arrows indicate dependencies.

Dependency subgraph 530 depicts components, including: an application (App 532); a host (a host w 534), which includes a Web Server 536, a Hypertext Preprocessor (PHP) Module 538, and a File Transfer Protocol (FTP) Server 540; and a MySQL Server 542. The blue-colored arrows in dependency subgraph 530 indicate dependencies in the direction of the arrow, e.g., App 532 is dependent upon Web Server 536, which is in turn dependent upon PHP Module 538, which is in turn dependent upon MySQL Server 542.

Configuration subgraph 550 depicts configuration parameters which correspond to certain components of dependency subgraph 530. For example, configuration subgraph 550 can include a PHP Configuration "hypernode" 552 which includes three "components" or configuration parameters (554, 556, and 558), where PHP Configuration hypernode 552 corresponds to PHP Module 538 of dependency subgraph 530. That is, nodes 554, 556, and 558 are configuration parameters of PHP module 538. This correspondence is indicated by a blue-colored thick dashed arrow 578. Similarly, configuration subgraph 550 can include a MySQL Configuration hypernode 560 which includes a component 562, which is a configuration parameter corresponding to or of MySQL Server 542 of dependency subgraph 530. This correspondence is indicated by a blue-colored thick dashed arrow 580.

Furthermore, configuration subgraph 550 can include an OS Configuration hypernode 568 which includes a component 570, which is a configuration parameter corresponding to or of MySQL Server 542 of dependency subgraph 530. This correspondence is indicated by a blue-colored thick dashed arrow 582. Similarly, configuration subgraph 550 can include an FTP Configuration hypernode 564 which includes a component 566, which is a configuration parameter corresponding to or of FTP Server 540 of dependency subgraph 530. This correspondence is indicated by a blue-colored thick dashed arrow 584.

Configuration subgraph 550 can indicate relationships between and among configuration parameters of the components of the composed system. As an example, given a system as in diagram 500, an attacker can first establish a trust relationship (via precondition 522) from his machine (e.g., host a) to the server (host 534) via the exploit ftp_rhosts(a,w) (via precondition 512 and vulnerability 514) on host w 534. The attacker can then gain user privileges (via precondition 524) on host w 534 with an rsh login (via vulnerability 516). Finally, the attacker can gain root privileges on host w (via precondition 520) by exploiting a local buffer overflow attack on host w (via vulnerability 518). These actions and consequences are depicted as blue arrows in vulnerability subgraph 510, and as black-color thick dashed arrows of communication (e.g., 572, 574, and 576) to Web Server 536 of dependency subgraph 530.

Subsequently, the attacker can intentionally mis-configure a parameter which can result in a Denial of Service (DoS) attack. For example, the attacker can set the PHP configuration parameter mysql.allow_persistent to a number larger than MySQL Server's max_connection parameters. This intentional mis-configuration is shown by the red-colored thick dashed arrow 586, and can result in a DoS attack for certain client loads. Thus, diagram 500 illustrates how all three subgraphs are necessary to facilitate reasoning about misconfigurations and their security impact.

The red-colored arrows in configuration subgraph 550 (e.g., 588, 590, 592, and 594) indicate relationship dependencies within or between configuration parameters in one hypernode for a corresponding component (e.g., 588 and 590), as well as among or across configuration parameters of multiple hypernodes (e.g., 592 and 594). These relationships can be captured as configuration constraints, and are described below in relation to FIG. 6.

Figure 6:
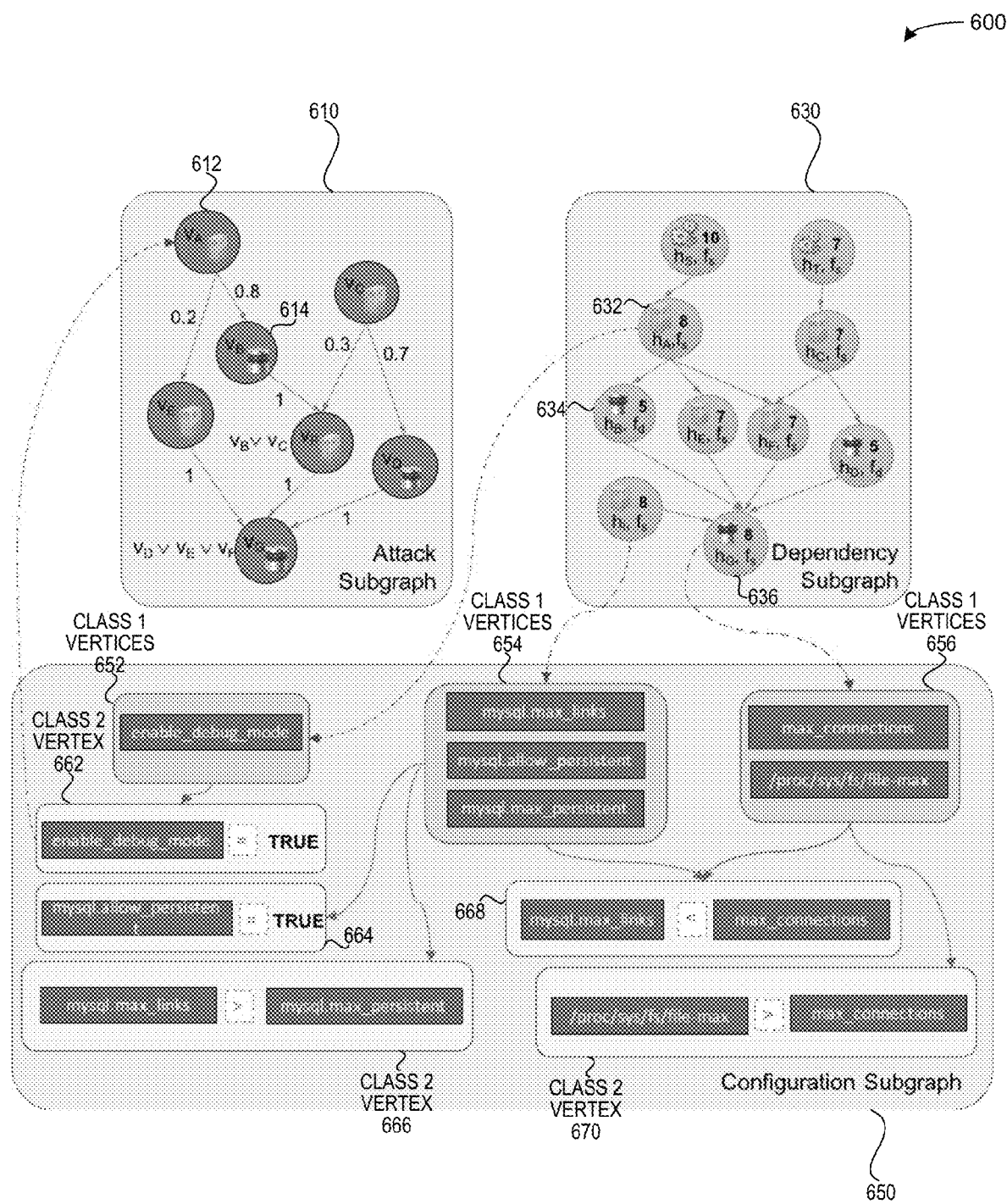
FIG. 6 illustrates an exemplary diagram of a multi-layer composed system graph, including relationships between configuration parameters and constraints between and among those configuration parameters, in accordance with an embodiment of the present application.

FIG. 6 illustrates an exemplary diagram 600 of a multi-layer composed system graph, including relationships between configuration parameters and constraints between and among those configuration parameters, in accordance with an embodiment of the present application. Diagram 600 includes an attack subgraph 610, a dependency subgraph 630, and a configuration subgraph 650. Diagram 600 is similar to diagram 500, but for purposes of illustration and simplicity, is depicted in a flattened manner, and does not include the connections between the attack subgraph and the dependency subgraph. A detailed example of the connections between the attack subgraph and the dependency subgraph is described below in relation to FIG. 7.

As described above, Modeling Framework 304 of FIG. 3A (e.g., of SCIBORG) can use the ingested data from Data Ingestion Framework 302 to construct a three-layer directed graph that efficiently encodes the information needed for computing optimal configurations. The first layer comprises a dependency subgraph; the second layer, a configuration subgraph; and the third layer, an attack subgraph. The edges between these three subgraphs determine the functional composition and the attack surface for a configuration set.

The dependency subgraph (subgraph 630) represents the functional dependencies between components of the target composed system. In this subgraph, each vertex represents a functional component and carries a utility value. Each vertex also has a label identifying one of three dependency types, as described in the "dependency subgraph" subsection. Each edge in the dependency subgraph represents a functional dependency on another component, as specified by the dependency label of the parent vertex.

The configuration subgraph (subgraph 650) represents relationships between configuration parameters, both within any system component and across different components of the composed system. There are two classes of vertices in the configuration subgraph: "Class 1" vertices capture per-component configuration parameters; and "Class 2" vertices capture relationships among (or conditions on) the configuration parameters. These relationships are specified by functional system requirements and admissibility of the configuration setting, as described below in the "configuration subgraph" subsection. Furthermore, some of the relationships between the configuration parameters enable or disable preconditions for system vulnerabilities, which results in inducing a particular attack subgraph for that configuration.

For example, configuration graph 650 can include Class 1 vertices 652, 654, and 656, where each group of Class 1 vertices is depicted in its own pink-colored box and corresponds to configuration parameters for a specific component depicted in dependency subgraph 630. Furthermore, configuration graph 650 can include Class 2 vertices 662, 664, 666, 668, and 670, where each respective Class 2 vertex is depicted in its own beige-colored box and corresponds to a configuration constraint between configuration parameters (whether between configuration parameters within a same component or across different components), such as the configuration parameters indicated by Class 1 vertices 652-656.

The attack subgraph (subgraph 610) represents the propagation of potential multi-step attacks on components in the dependency graph for a particular configuration. In the attack subgraph, each vertex represents a vulnerability. An edge in the attack subgraph indicates that exploiting the parent vulnerability (a node at the start of a first arrow) can set the stage for the attacker to exploit the child vulnerability (at node at the end of the first arrow). Each edge is also labeled with a probability value, representing the probability of the attack progressing along that edge. This value is described below in the "attack graph" subsection.

The three subgraphs are connected to each other with three types of edges, constructing SCIBORG's model of the system:
1) Edges from the dependency subgraph to the configuration subgraph:
   A directed edge between components in the dependency graph to a Class 1 vertex in the configuration graph represents the list of configuration parameters associated with that component. There are no edges between the dependency subgraph and Class 2 vertices in the configuration subgraph.
2) Edges from the configuration subgraph to the attack subgraph:
   A directed edge between a Class 2 node in the configuration subgraph to a vertex in the attack subgraph (i.e., a vulnerability) implies that the relationship expressed in the Class 2 vertex satisfies a precondition for that vulnerability.
3) Edges from the attack subgraph to the dependency subgraph:
   An edge between a vertex in the attack subgraph (i.e., a vulnerability) to a vertex in the dependency subgraph (i.e., a system component) represents the amount of degradation (i.e., exposure factor) of the component due to exploitation of the vulnerability and ranges from 0 to 1.

Dependency Subgraph

Knowledge of system dependencies is crucial for computation of the optimal system configuration, as a configuration change in one component is likely to impact other dependent components dramatically. Since these dependencies may not be explicitly visible or documented, failing to capture them can pose a risk. SCIBORG addresses this risk by capturing and integrating system dependencies in its modeling framework.

Dependencies among network entities can be broadly classified in three categories1: 1) redundancy ($f_r$), wherein a network component depends on a redundant pool of resources; 2) strict dependence ($f_s$), wherein a component strictly depends on a pool of other components, such that, if one fails, the dependent component becomes unavailable; and 3) graceful degradation ($f_d$), wherein a network component depends on a pool of other components such that, if one fails, the system can continue to work with degraded performance.

In FIG. 6, an edge from $h_A$ 632 to $h_B$ 634 indicates that $h_A$ 632 depends on $h_B$ 634. The type of dependency is shown on each node (e.g., $f_s$ on $h_A$ 632 and $f_d$ on $h_B$ 634 $h_A$). The number on each node represents the utility value of the corresponding machine or component (e.g., "8" on $h_A$ 632 and "5" on $h_B$ 634). In practice, such utility values can be assigned by a domain expert or be automatically derived by computation of a centrality metric.

In graph theory, a centrality measure captures important properties of a graph in order to determine how important or central each node is with respect to a given function or mission, which in the case of dependency graphs, is the ability to sustain correct operation of the system. A prime example of the utility of this approach is PageRank—a variant of the eigenvector centrality—which is used by Google to measure the importance of web pages. In the area of security, ad-hoc centrality measures have been defined for botnet detection and mitigation. Furthermore, although it is possible to automatically discover dependencies, the task of understanding the nature of such dependencies has not been fully automated yet.

Configuration Subgraph

Most of the existing approaches for solving configuration errors cannot tackle configuration errors that break the cross-component dependencies and correlations, let alone address the security implications of such configuration parameter dependencies. The sample mission control system of FIG. 4 is represented by a real-world example of such cross-component dependency between a MySQL and PHP-enabled Apache Web Server, as depicted in FIG. 6. The PHP parameter, mysql.max_persistent (node 558 in FIG. 5), configures the maximum number of persistent MySQL connections per process. The MySQL parameter, max_connections (node 562 in FIG. 5), configures the maximum permitted number of simultaneous client connections. Unless the setting of mysql.max_persistent in PHP is smaller than the setting of max_connections in MySQL, "too many connections" errors are raised, which can lead to service unavailability.

Errors like this one effectively result in service interruptions that can typically be very costly to find and address in practice. Furthermore, they are not uncommon at all. The issue is even more critical for complex systems where each component is developed by independent teams. Furthermore, malicious actors are very likely to utilize such configuration dependencies, alongside various system vulnerabilities, to develop context-aware Advanced Persistent Threats (APTs).

In the embodiments described herein, the SCIBORG scheme-based system can generate configuration subgraphs for all the components of the composed system to capture configuration parameter dependencies. In FIG. 6, as described above, there are two classes of nodes in the configuration subgraph represented with different shades in the figure. A first class of nodes captures per-component parameters (Class 1 nodes or vertices, such as 652-656, depicted in the pink-colored boxes), while a second class of nodes captures relationships among (or conditions on) those configuration parameters (Class 2 nodes or vertices, such as 662-670, depicted in the beige-colored boxes).

While part of the information needed to construct these graphs is likely to be provided by TA1 systems, it may not be sufficient to construct comprehensive graphs. The degree to which configuration parameter dependencies, within and across components, can be captured depends to a large degree on the complexity of the components themselves and completeness of their documentation. Since such a lack of comprehensiveness poses a risk to successful execution of TA2 systems, the embodiments of the system described herein can also utilize information from existing, private or public knowledge repositories (e.g., StackOverflow) pertaining to configuration dependencies for relevant components (e.g., knowledge repositories 106 of FIG. 1).

Finally, SCIBORG can provide a user-friendly interface for domain/component experts to provide configuration dependency information, as described below in the section titled "Providing Human-Understandable Insights re: Optimal Configuration Parameters (Evidence Generation Framework)."

Attack Subgraph

The embodiments of the system described herein can utilize a specific form of attack graphs (e.g., as discussed in Albanese, M., and Jajodia, S., *A Graphical Model to Assess the Impact of Multi-Step Attacks*, THE JOURNAL OF DEFENSE MODELING AND SIMULATION, Vol. 15, Issue 1, 2018, first published Apr. 26, 2017 (hereinafter "Albanese 2017")), in order to assess and reduce the impact of various configuration parameters on the size of the attack surface. Attack graphs are powerful conceptual tools that can represent prior knowledge about vulnerabilities, their dependencies, and network connectivity. In FIG. 6, in attack subgraph 610, the nodes represent known vulnerabilities. An edge from vulnerability $V_A$ 612 to vulnerability $V_B$ 614 means that exploiting $V_A$ 612 satisfies some of the preconditions for exploiting $V_B$ 614. Such attack graphs can be generated by combining information from network scanners (e.g., Nessus and Retina) and vulnerability databases (e.g., Common Vulnerabilities and Exposures (CVE) and National Vulnerability Database (NVD)). A successful implementation of an attack graph generation tool is Cauldron. The embodiments of the system described herein can utilize Cauldron to generate the attack subgraph.

In attack subgraph 610 of FIG. 6, the edges are labeled with probability values. These probability values can be utilized to infer the most likely course of the progression of a multi-step attack. A relevant research question is how these values can be computed reliably for use in SCIBORG.

Prior work has shown how to successfully develop probabilistic graph-based models to capture and reason about complex activities, how this approach can be generalized to develop probabilistic temporal attack graphs (as in Albanese 2017), and how to leverage existing work on estimating the mean time to compromise a system by relating that to the skill level of the attacker relative to the intrinsic complexity of the exploit. The embodiments of the system described herein leverage and generalize approaches in Albanese 2017 to augment the output of Cauldron by estimating probability distributions for individual vulnerability exploits.

The likelihood that an attacker will exploit a given vulnerability, within a given amount of time, varies with the skill level of the attacker. Vulnerabilities that are more complex to exploit are less likely to be exploited. The Common Vulnerability Scoring System (CVSS) defines Access Complexity (AC) as a metric to measure the intricacy of the attack required to exploit the vulnerability once an attacker has gained access to the target system. The embodiments of the system described herein use this CVSS-defined AC metric in building the Modeling Framework.

Formally capturing the attack surface of a target system using the attack graph enables the described system to quantitatively reason about the impact of proposed configuration changes on the total attack surface through use of metrics such as the size of the attack graph, as well as the impact of multistep attacks.

Construction of the Multi-Layer Graph from the Three Subgraphs

The three subgraphs are connected to each other with three types of edges, building the Modeling Framework of the system. The connections include: 1) edges from the dependency subgraph to the configuration subgraph; 2) edges from the configuration subgraph to the attack subgraph; and 3) edges from the attack subgraph to the dependency subgraph.

Combining Dependency and Configuration Subgraphs

As discussed above, a directed edge between components in the dependency graph to a Class 1 vertex in the configuration graph represents the list of configuration parameters associated with that component. There are no edges between the dependency subgraph and Class 2 vertices in the configuration subgraph.

Note that the connections between the dependency graph and the configuration graph clearly indicate the configuration parameters that correspond to functionality that is not needed in the composed system, or functionality that is duplicated across various components. These parameters, along with their corresponding values required to disable the unneeded or duplicate functionality will be communicated to TA3.

Combining Configuration and Attack Subgraphs

Relationships among configuration parameters, captured by the configuration subgraph, in part enable preconditions necessary for exploitation of vulnerabilities. Defenders can set parameter values in a way that falsifies vulnerability preconditions, thereby making the corresponding vulnerabilities irrelevant. In the Modeling Framework, a node in the configuration subgraph is connected to a node in the attack subgraph if and only if the parameter relationship it captures acts as a precondition for the corresponding vulnerability. In FIG. 6, the vulnerability $V_A$ 612 only exists for the debug mode operation of $h_A$ 632 (as depicted below in FIG. 7, corresponding nodes 712 and 732, respectively). Thus, disabling this mode by unsetting the enable_debug_mode flag (of node 662) can substantially reduce the attack surface for operational contexts that do not require the debug mode.

The graph-based model of the embodiments described herein efficiently capture the relationship between configuration parameters (i.e., nodes in the configuration subgraph) and vulnerabilities (i.e., nodes in the attack subgraph), allowing the Reasoning Framework to efficiently assess the impact of any configuration change on the attack surface (e.g., captured as the attack subgraph).

Combining Attack and Dependency Subgraphs

Finding configurations that measurably reduce the attack impact and attack surface (e.g., by reducing the size of the attack graph) necessarily depends on efficiently and jointly analyzing the information captured in the three subgraphs discussed above. To illustrate this point, consider the graph shown in FIG. 7.

Figure 7:
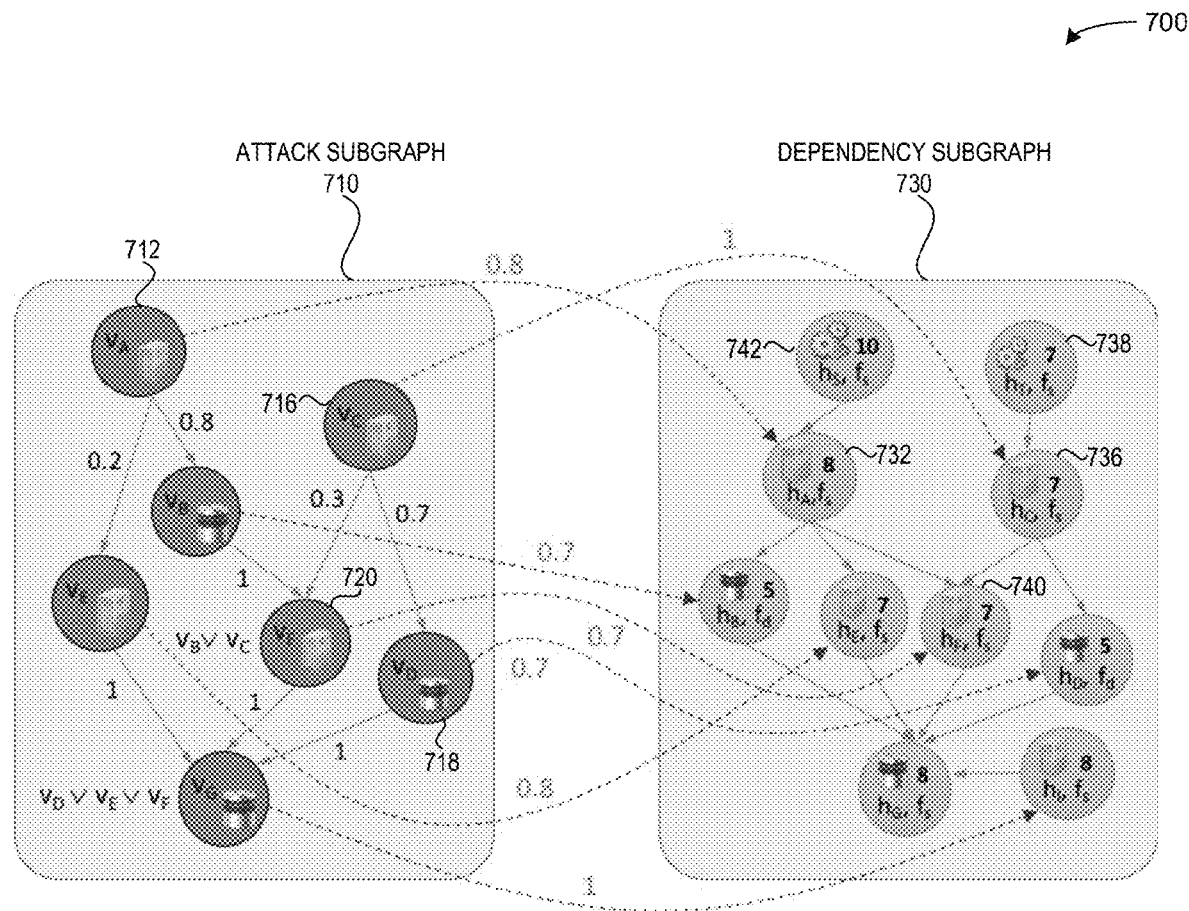
FIG. 7 illustrates an exemplary diagram which combines an attack subgraph and a dependency subgraph, in accordance with an embodiment of the present application.

FIG. 7 illustrates an exemplary diagram 700 which combines an attack subgraph 710 and a dependency subgraph 730, in accordance with an embodiment of the present application. Subgraphs 710 and 730 correspond, respectively, to subgraphs 610 and 630 of FIG. 6. An edge from a node in attack subgraph 710 (i.e., a vulnerability) to a node in dependency subgraph 730 (i.e., a system component) indicates that the component can be directly impacted by the exploitation of that vulnerability. The edge weight represents the exposure factor (EF)—or loss potential—that is the percentage reduction in the value—or utility or asset value (AV)—of that system component when the corresponding vulnerability is exploited. Exposure factors are a key element of classical quantitative risk analysis (SANS, 2002), and can be determined by domain experts or learned from historical data, a typical practice in quantitative risk analysis.

In FIG. 7, suppose that an attacker exploits vulnerability $V_C$ 716. This will make $h_C$ 736 completely unavailable, as the exposure factor is 1. As $h_T$ 738 strictly depends on $h_C$ 736, $h_T$ 738 will also become unavailable, leading to a marginal impact of 7+7=14 as a consequence of exploiting $V_C$ 716.

We assume a simple impact function:

$$\text{impact}(v_j) = \Sigma_{h \in H} u(h) \cdot \Delta s(v_j, h) \qquad \text{Equation (1)}$$

which, for a given attack step v, sums the marginal losses for all the components affected—either directly or indirectly—by the exploitation of a given vulnerability. In quantitative risk analysis, the Single Loss Expectancy (SLE) associated with a single incident can be computed as AV×EF. However, when modeling multi-step attacks, the value of an asset may be repeatedly affected and further reduced by successive attack steps. There, the embodiments of the described system model the relative residual value of a system component h as a function of s(h), where s(h)=1 denotes that h retains 100% of its value u(h), and s(h)=0 denotes that h has lost 100% of its value. Then, the SLE for a single attack step is proportional to the variation $\Delta s(v_j, h) = s_{j-1}(h) - s_j(h)$ in the value of s(h) caused by the exploitation of $v_j$ as the j-th step of a multi-step attack.

After exploiting $V_C$ 716, the attacker may take one of two steps: exploiting $V_D$ 718 with probability 0.7; or exploiting $V_F$ 720 with probability 0.3. Intuition may suggest, as the attacker is more likely to exploit $V_D$ 718, that vulnerability should be preferentially patched or addressed before $V_F$ 720. However, this approach turns out to be incorrect. In the first case, the additional impact of the exploit $V_D$ 718 would be 0.7*5=3.5, because $h_C$ 736 and $h_T$ 738 are already unavailable because of the previous exploit. In the second case, the additional impact of the exploit $V_F$ 720 would be 0.7*7+8+10=22.9, because compromising $h_F$ 740 also makes $h_A$ 732 and $h_S$ 742 unavailable.

This simple example explains why globally optimal security decisions (e.g., deciding which vulnerability to patch or make unreachable) cannot be made without dependency information. Formally, the impact of the adversary sequentially exploiting the vulnerabilities $v_1, \ldots, v_n$ in a given path $P = (v_1, \ldots, v_n)$ in the attack subgraph can be computed by:

$$\text{impact}(P) = \sum_{j \in [1 \ldots n]} \sum_{h \in H} u(h) \cdot (s_{j-1}(h) - s_j(h)) \qquad \text{Equation (2)}$$

where $s_j(h)$ denotes the relative residual value of asset h after attack step j, when the attacker exploits vulnerability $v_j$ in path P. Assume that $s_0(h)=1, \forall h \in H$, i.e., all system components are 100% functional before any attack starts.

For each $j \in [1, n]$, the value of $s_j(h)$ can be computed as follows:

If $\exists (v_j, h) \in E_{ad}$, then:

$$s_j(h) = s_{j-1}(h) \cdot (1 - w_{Vj,h}) \qquad \text{Equation (3)}$$

Else if $\exists \{h_1, \ldots, h_m\} \subseteq H$ s.t. $(h, h_1) \in E_d \wedge \ldots \wedge (h, h_m) \in E_d$, then:

$$s_j(h) = f(s_j(h_1), \ldots, s_j(h_m)) \qquad \text{Equation (4)}$$

where: $w_{Vj,h}$, or the "exposure factor," is the weight of the edge connecting node $v_j$ in the attack subgraph to node h in the dependency subgraph (this weight is 0 if no edge exists between the two nodes); $E_{ad}$ is the set of edges from nodes in the attack subgraph to nodes in the dependency subgraph; and $E_d$ is the set of edges in the dependency subgraph. In other words, when an asset is directly impacted by an exploit, the SLE is driven by the exposure factor, whereas dependencies drive the SLE of assets which are only indirectly impacted by the same exploit.

Solving the Optimization Problem (Reasoning Framework)

Reasoning Framework 306 of architecture 300 depicted in FIG. 3A formulates the problem of finding the most suitable configuration as a constrained optimization problem and also uses novel techniques to solve this constrained optimization problem. Describing the constraints and parameters of the optimization involves utilizing the properties of the three-layer graph constructed by Modeling Framework 304, as described herein and in FIG. 8 below.

Figure 8:
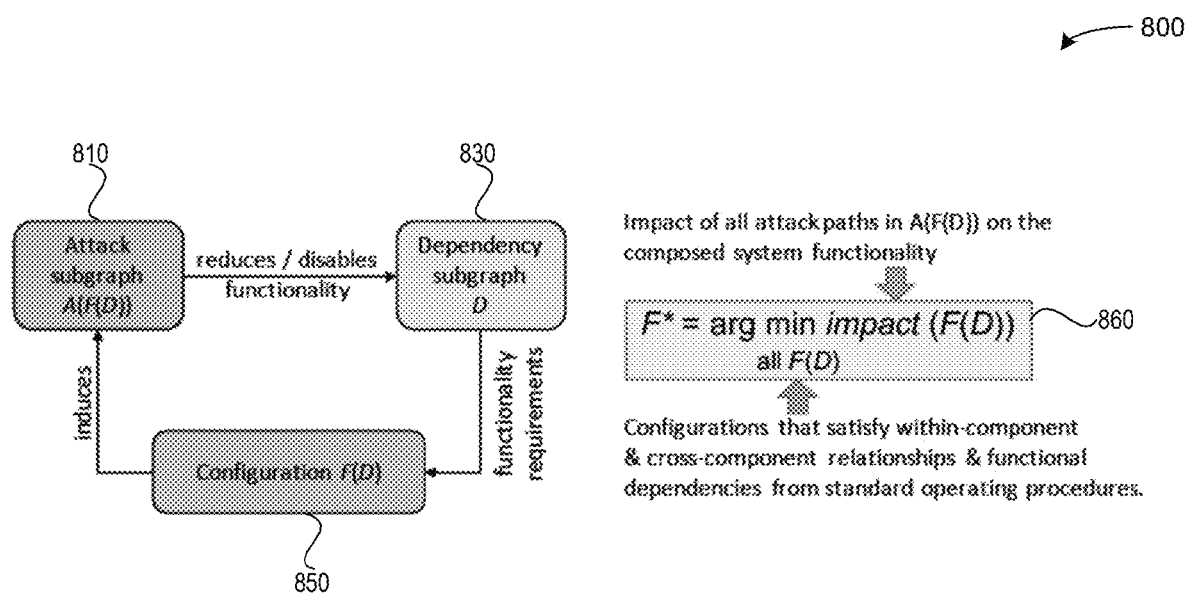
FIG. 8 illustrates a high-level exemplary diagram of a multi-layer composed system graph, in accordance with an embodiment of the present application.

FIG. 8 illustrates a high-level exemplary diagram 800 of a multi-layer composed system graph, in accordance with an embodiment of the present application. Diagram 800 includes an attack subgraph 810, a dependency subgraph 830, and a configuration subgraph 850. Diagram 800 also indicates a high-level formulation 860 of the optimization problem, i.e., determining which set of configuration parameter values most optimally satisfy the within-component and across-component relationships and functional dependences from standard operating procedures.

One approach to solving the constrained optimization problem starts by considering that the topology of the system components (e.g., from user manuals) generates a dependency subgraph D (e.g., 830). This imposes certain conditions on the configuration set F(D) (e.g., 850), many of which may be obtained from TA1 via standard operating procedures. F(D), in turn, induces an attack subgraph A(F(D)) (e.g., 810) that can reduce or disable the functionality of the system components in D.

Alternatively, if a dependency subgraph is not readily available from TA1, the embodiments of the system described herein can generate a candidate configuration that satisfies explicit parameter relationships provided by an operator (e.g., a system operator, a power user, a system administrator, or other user). In this case, the formulation would be slightly different: A candidate configuration F creates a dependency subgraph D(F), and an attack subgraph A(F).

Motivation for the Novel SMT-Based Approach Utilized in the Described Embodiments SMT solvers answer questions of the form, "Given a set of mathematical conditions C, is it possible for X to happen, and if so, how?" The notion of satisfiability comes from mathematical logic. An equation or formula is satisfiable if, by choosing appropriate values for the variables, it can be made true. Satisfiability of a formula, therefore, depends on the domain of values each parameter can take, captured by the notion of theory in SMT jargon. For example, x2+4=0 is not satisfiable if x ranges over real numbers. A theory defines what values a variable can have and what the symbols in the formula mean. The power of SMT comes from its ability to handle many different kinds of theories. In addition to arithmetic, SMT solvers can reason automatically about Boolean operators, arrays, and matrices, character strings, and software data structures such as lists, trees, and graphs.

Furthermore, SMT frameworks are extensible, meaning that new theories can be added to suit specific application domains. Another strength of SMT is the ability to exploit arbitrary (hence, flexible) combinations of theories. This flexibility enables them to reason about, for example, a matrix of integers, an array of strings, and a list of trees. Such properties allow the SMT-based reasoning framework of the described embodiments to capture complicated, arbitrary constraints over complex configuration spaces. This characteristic is a significant advantage over typical optimization solvers that do not have this flexibility. Advanced SMT solvers (such as Z3) can also support un-interpreted functions, which may be particularly beneficial for expressing dependency constraints.

SMTs are an emerging technology, but have already proven to be extremely effective in exposing design errors in the logical functioning of modern electronic chips. SMTs have also been successfully applied in model-based engineering for embedded systems, software model checking, and software testing. Security applications of SMTs have thus far been limited to automatic vulnerability discovery in old cryptographic and networking protocols. The described embodiments achieve novelty in computer technology by applying SMTs to address configuration problems in composed systems.

SMT-Based Reasoning Formulation in the Described Embodiments

A general structure of the approach to find optimal configurations in the described embodiments is provided herein. Suppose there are k parameters in the composed system's configuration set. Let M be the multi-layer graph produced by the modeling framework, containing a configuration subgraph C, a dependency subgraph D, and an attack subgraph A. As explained above, C encodes constraints in the configuration space. Similarly, D encodes dependency (and performance) constraints on system components. As described earlier, every configuration enables or disables a set of preconditions for the system's vulnerabilities, which are nodes in the attack subgraph. If some configuration parameters $F=(f_1, f_2, \ldots, f_k)$ are set in a way that makes the preconditions of some of the vulnerabilities unsatisfied, the nodes corresponding to those vulnerabilities can be ignored as they cannot be exploited by any attacker. Note that even though the vulnerability is still there because it has not been patched, the vulnerability cannot be reached due to the configuration (e.g., by disabling a specific vulnerability node, or by removing a configuration constraint which satisfies a precondition for a specific vulnerability). If the configuration changes again, the vulnerability may become reachable again. This approach results in a smaller attack subgraph for that configuration. We denote this smaller attack subgraph by A(F). In other words, a configuration set F induces an attack subgraph A(F), which is a subset of A. Note that graphs are formally represented as sets. For example, A(F) is a graph whose formal representation is a subset of that of A.

In the described embodiments, the Reasoning Framework uses an SMT solver to solve the following problem to find configurations that minimize the attack impact while preserving functionality, performance, and configuration constraints:

Find configuration $F=(f_1, f_2, \ldots, f_k)$ such that:
1) Constraints encoded by C are satisfied;
2) Constraints encoded by D are satisfied; and
3) $impact_c(F)$ is minimized where $impact_c(F)$ is the configuration impact given by:

$$impact_c(F) = \sum_{P \in A(F)} impact(P) \qquad \text{Equation (5)}$$

where $P=(v_1, \ldots, v_n)$ is any path in the attack subgraph A(F), and impact(P) is the impact of the adversary sequentially exploiting the vulnerabilities $v_1, \ldots, v_n$ in path P per formulation, as described above in the section titled "Detailed Exemplary Diagrams of a Multi-Layer Composed System Graph (Modeling Framework)."

The Reasoning Framework will derive the above constraints from the multi-layer graph produced by the Modeling Framework. As discussed above, the embodiments described herein use an SMT solver that supports a variety of theories (e.g., Z3) because it allows for complex constraints on the configuration parameters.

In addition to automatically extracting constraints from the multi-layer graph, the Reasoning Framework provides an interface for a user to define additional constraints. Using this interface, an advanced user can incorporate domain-specific performance and functionality models that the system can exploit to derive novel constraints to further fine-tune the optimization process.

The Reasoning Framework also specifies the best configuration pathway when switching between operational contexts. To achieve this, the system first derives optimal configurations per operational context, and then determines an optimal ordering for changing each parameter such that the attack surface and the configuration impact are minimized throughout the transition. The ordering of configuration changes leverages the graph-based architecture of the system. Specifically, while changing the setting for any configuration parameter, the system checks whether new attack paths are created as a result of the change and what the configuration impact of each attack path is. The system also provides a friendly graphical user interface for non-expert operators to conduct "what if analyses" to assess the potential impact of configuration changes on security and performance metrics.

The optimized configuration computed by the reasoning framework will be provided to TA1, along with a human understandable justification for its optimality (which is produced by the Evidence Generation Framework described below).

Approach to Increase Configuration Space Coverage

Figure 9:
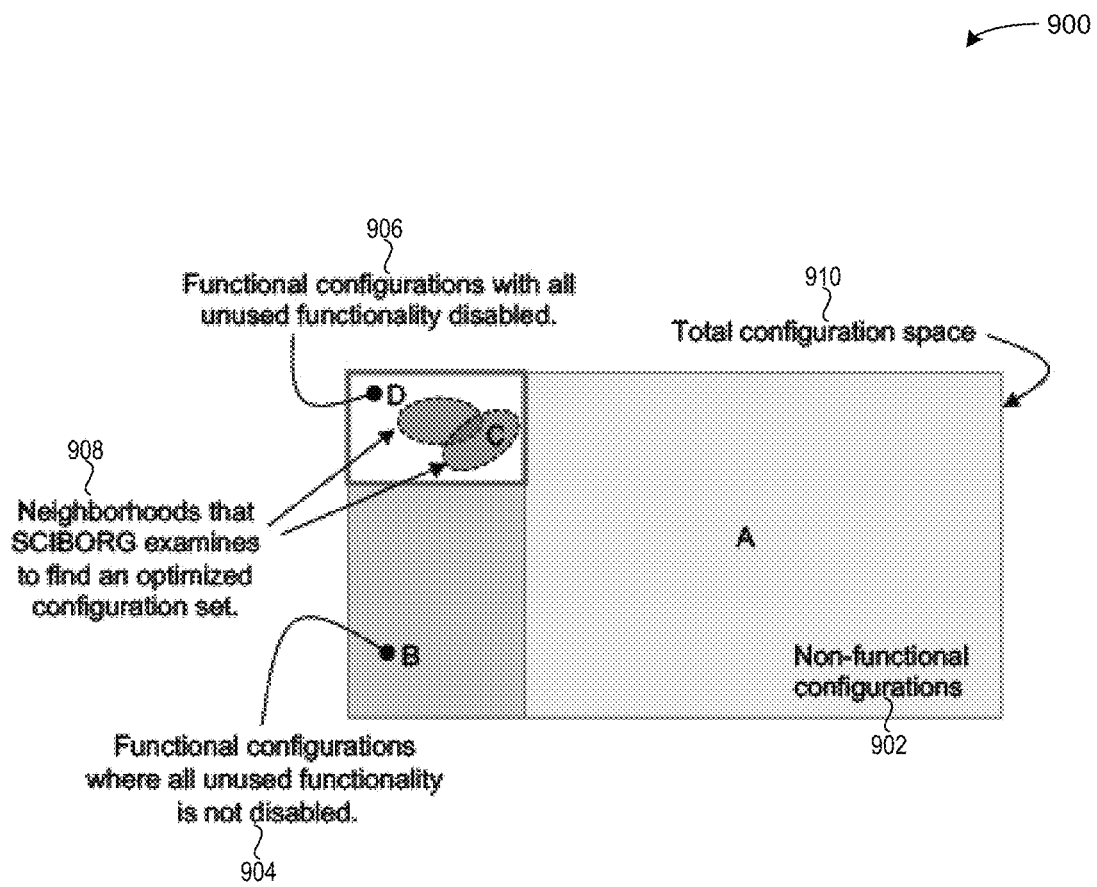
FIG. 9 illustrates a diagram depicting difference subspaces of the configuration space, in accordance with an embodiment of the present application.

The graph-based approach of the described embodiments results in a reduction of the number of configuration sets to be examined. FIG. 9 illustrates a diagram 900 depicting difference subspaces of the configuration space, in accordance with an embodiment of the present application. Diagram 900 is a Venn diagram which indicates a total configuration space 910. Diagram 900 includes: a region A 902 (non-functional configurations); a region B 904 (functional configurations where all unused functionality is not disabled); and a region D 906 (functional configurations with all unused functionality disabled). Region D 906 can include neighborhoods 906 (including neighborhood C) (neighborhoods that the system examines to find an optimized configuration set).

For a completely specified dependency subgraph, configuration sets that break any functional dependency belong to region A. This region A is immediately covered by the described system and rejected. In practice, it may not be possible to identify all the nodes and edges in the dependency graph at the initial stages of the project, but as the knowledge of the dependency graph improves (e.g., via parameter constraints provided by TA1, or in the form of operator input), the system can account for more and more of region A.

The connections between the system's dependency subgraph and configuration subgraph expose configuration parameters for unused functionalities. Disabling these unused functionalities immediately reduces the number of configuration sets that needs to be tested (region D). As above, region B would be fully accounted for if the unused functionalities for the dependency graph were all known. In practice, as knowledge of the dependency graph improves, the system's coverage of region B also increases.

The knowledge extracted from the standard operating procedures by TA1, in conjunction with threat intelligence and vulnerability databases ingested by the system, suggest some parameter values and impose some constraints on the configuration parameters. As long as the constraints do not break the functional dependencies, they provide a neighborhood C (in region D) that can be examined for optimality by the Reasoning Framework.

To increase the configuration space coverage, two conditions must be satisfied: 1) The Reasoning Framework must generate new candidate configuration sets that induce novel attack graphs, without compromising functionality; and 2) The novel neighborhoods being examined do not have a large intersection with the neighborhood(s) examined beforehand (i.e., the intersections of the small sets in region C should not be too large).

Providing Human-Understandable Insights re: Optimal Configuration Parameters (Evidence Generation Framework)

To ensure that human operators can easily understand and confirm the usefulness of output configurations, the embodiments of the system described herein can explain and visualize the impact of the computed configuration on the attack surface, as captured by the attack graph, and overall system utility, as captured by the dependency graph. The evidence supporting the optimized configuration set can be provided using an operator interface or a user interface (e.g., a graphical user interface). The evidence not only explains the properties of the optimized configuration set, but also clarifies the decisions taken by the Reasoning Framework during the optimization process.

An additional motivation for modeling the composed system as a combination of dependency, configuration, and attack subgraphs, is that the structural properties of these subgraphs can drive human-understandable insights as to why one configuration set is better than another. Consider, for example, the node $h_F$ 740 in dependency subgraph 730 in FIG. 7. This node has high "betweenness" centrality, which means that it acts as a bridge along the shortest path between many pairs of nodes. Two cases exist:

(1) Suppose that the Reasoning Framework yields a configuration set $\ominus$ that addresses the vulnerability $v_F$ 720. Knowing the high centrality of $h_F$ 740, the Evidence Generation Framework can explain to the operator that SCIBORG recommended $\ominus$ because it protects $h_F$ 740, an important system component, without impacting the functionality of the system.

(2) Suppose that the Reasoning Framework yields a configuration set $\ominus'$ that does not address the vulnerability $v_F$ 720. Knowing the high centrality of $h_F$ 740, the Evidence Generation Framework can explain to the operator that addressing $v_F$ 720 may have adversely impacted the functionality of the system. The system can further indicate that it was compelled to favor functionality over security, but can also alert the operator that the operator may wish to consider alternate architectural approaches that can achieve functionality without exposing a large attack surface.

As described above in the section titled "Solving the Optimization Problem (Reasoning Framework)," the system can derive optimized configuration sets by solving a constrained optimization problem. During the iterations of the optimization algorithm, the system can log several quantities of interest which can subsequently assist in generating evidence to support the final configuration set. Examples of these quantities of interest include:

(1) A description of the attack paths and their respective impacts for each attack graph induced by a candidate configuration;

(2) The dependency paths corresponding to each attack path; and (3) The number of nodes and edges in each attack graph induced by a candidate configuration.

The system can also produce a textual explanation of the optimality of the configuration in high-level human language, suitable for auditing and compliance purposes as well as efficient day-today system operation by a non-technician. The evidence is generated by translating the SMT optimization problem and its constraints into natural language, displaying the found optimized configuration, visualizing the multi-layer attack graphs before and after the configuration change, and providing a textual summary of the impact of the new configuration on the size of the attack surface and performance. These operations allow an operator or non-technician to subsequently adjust one or any combination of the configuration parameter values based on an operational context, a condition not automatically generated or considered by the system, or any other user-input related reason.

Summary of Improvements and Enhancements Provided by the Described Embodiments

In summary, the embodiments of the system described herein provide several improvements and enhancements over the existing state of the art in the computer technology field of providing security for a system of networked components. As one improvement, the system provides an approach to set the values of the configuration parameters of the system components such that the attack surface is reduced.

If the values of the configuration parameters were chosen just from standard operating procedures or user manuals, there is no guarantee that all the functional dependencies in the overall networked system would be satisfied. As a result, the overall system might not work under nominal settings of the configuration parameters for individual devices. As another improvement, the described system allows the configuration parameters to be set in such a way that certain restrictions on the parameter values can be relaxed in order to enable the desired functionality, while precisely quantifying the tradeoff in security.

The system also improves the manner in which a user can interact with the system to provide security for the system of networked components, by allowing an operator to determine which changes in the configuration parameters (for a system component or a device) results in the largest reduction in the attack surface. The system further allows the operator to quantify the impact of a given set of configuration parameter values on the overall vulnerability and performance of the networked system.

As yet another improvement, the system reduces the size of the search space of configuration parameter values, i.e., reduces the number of combinations of configuration parameter values that need to be tested. This is because a large number of possible configuration sets can immediately be rejected as being insecure or non-functional.

Thus, the embodiments of the system described herein provide a solution which is both necessarily rooted in computer technology and a specific implementation of a solution to a problem in the software arts. The described system also improves the functioning of the computer itself, because selecting a set of optimal configuration parameter values for the system of networked components can provide a more secure system which is less prone to attack, and thus enhances the functioning of the computer system itself.

Method for Facilitating Security in a System of Networked Components

Figure 10A:
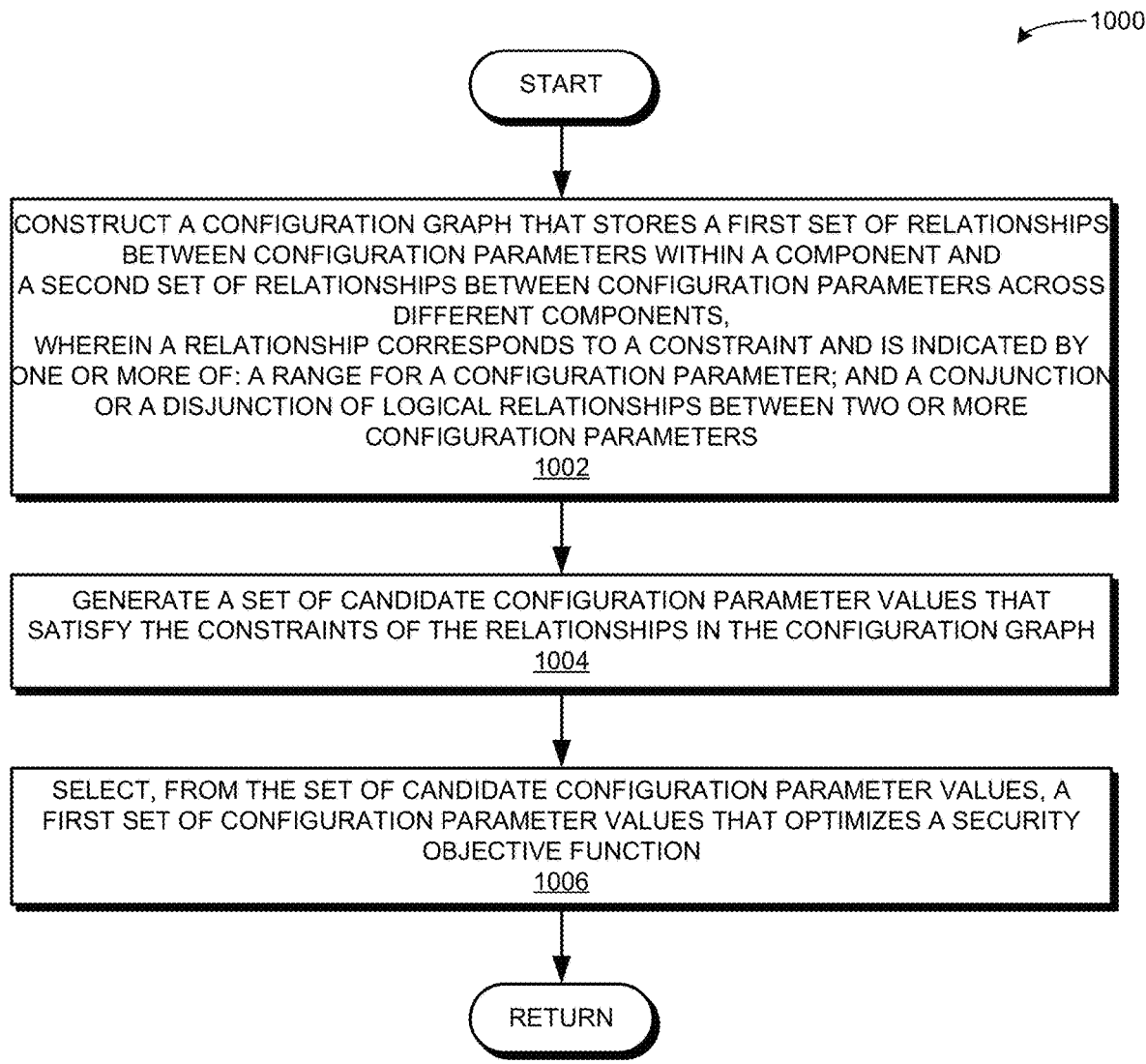
FIG. 10A presents a flow chart illustrating a method for facilitating security in a system of networked components, in accordance with an embodiment of the present application.

FIG. 10A presents a flow chart 1000 illustrating a method for facilitating security in a system of networked components, in accordance with an embodiment of the present application. During operation, the system constructs a configuration graph that stores a first set of relationships between configuration parameters within a component and a second set of relationships between configuration parameters across different components, wherein a relationship corresponds to a constraint and is indicated by one or more of: a range for a configuration parameter; and a conjunction or a disjunction of logical relationships between two or more configuration parameters (operation 1002). The system generates a set of candidate configuration parameter values that satisfy the constraints of the relationships in the configuration graph (operation 1004). The system selects, from the set of candidate configuration parameter values, a first set of configuration parameter values that optimizes a security objective function (operation 1006).

Figure 10B:
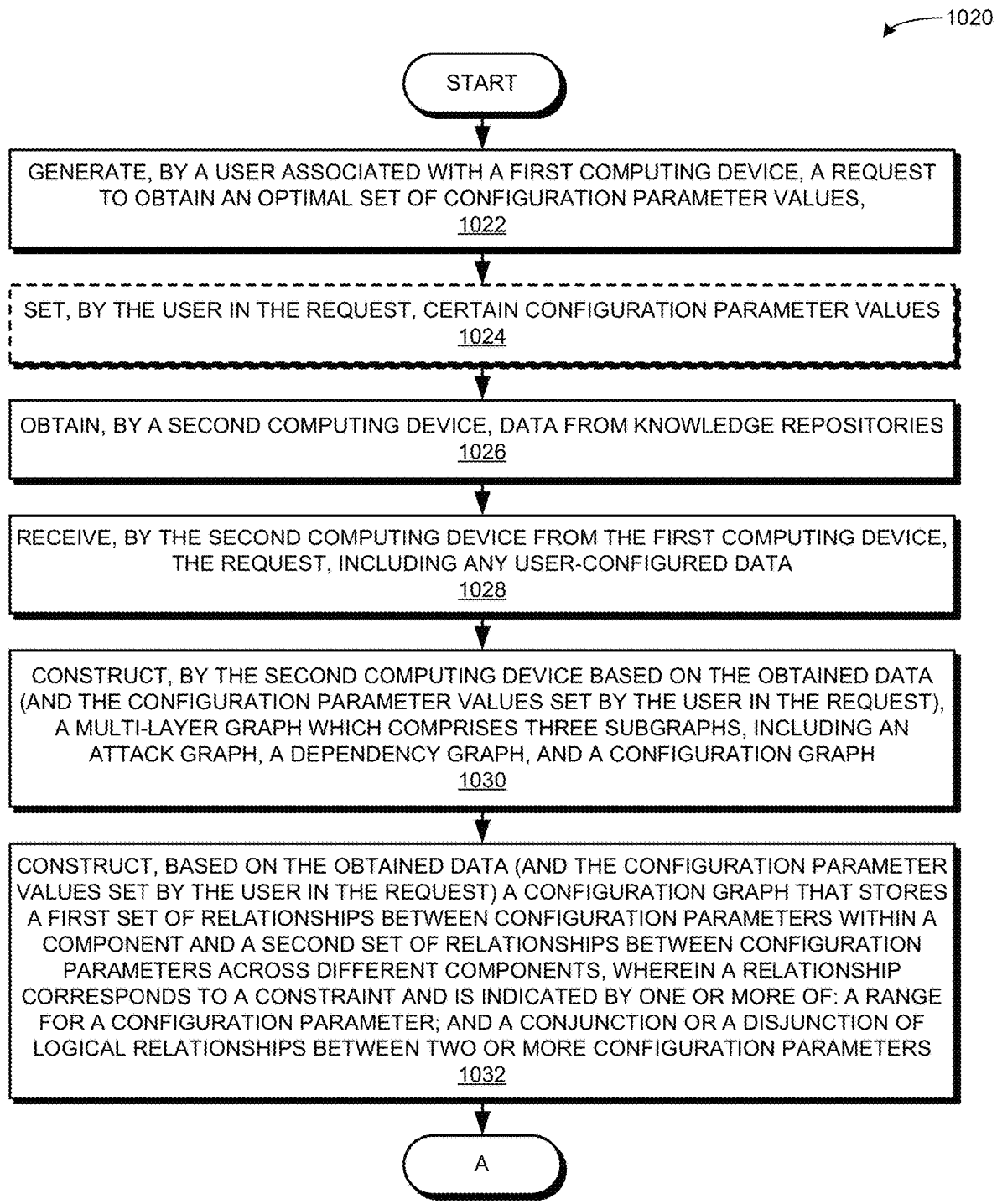
FIG. 10B presents a flow chart illustrating a method for facilitating security in a system of networked components, including user interactions, in accordance with an embodiment of the present application.

FIG. 10B presents a flow chart 1020 illustrating a method for facilitating security in a system of networked components, including user interactions, in accordance with an embodiment of the present application. During operation, the system generates, by a user associated with a first computing device, a request to obtain an optimal set of configuration parameter values (operation 1022). The system optionally sets, by the user in the request, certain configuration parameter values (operation 1024), e.g., "user-configured data." The system obtains, by a second computing device, data from knowledge repositories (operation 1026). The system receives, by the second computing device from the first computing device, the request, including any user-configured data (operation 1028). Note that operations 1026 and 1028 can occur before or after each other. The system constructs, by the second computing device based on the obtained data (and the configuration parameter values set by the user in the request), a multi-layer graph which comprises three subgraphs, including an attack graph, a dependency graph, and a configuration graph (operation 1030).

The system constructs, based on the obtained data (and the configuration parameter values set by the user in the request), a configuration graph that stores a first set of relationships between configuration parameters within a component and a second set of relationships between configuration parameters across different components, wherein a relationship corresponds to a constraint and is indicated by one or more of: a range for a configuration parameter; and a conjunction or a disjunction of logical relationships between two or more configuration parameters (operation 1032, similar to operation 1002). The operation continues as described below at Label A in FIG. 10C.

Figure 10C:
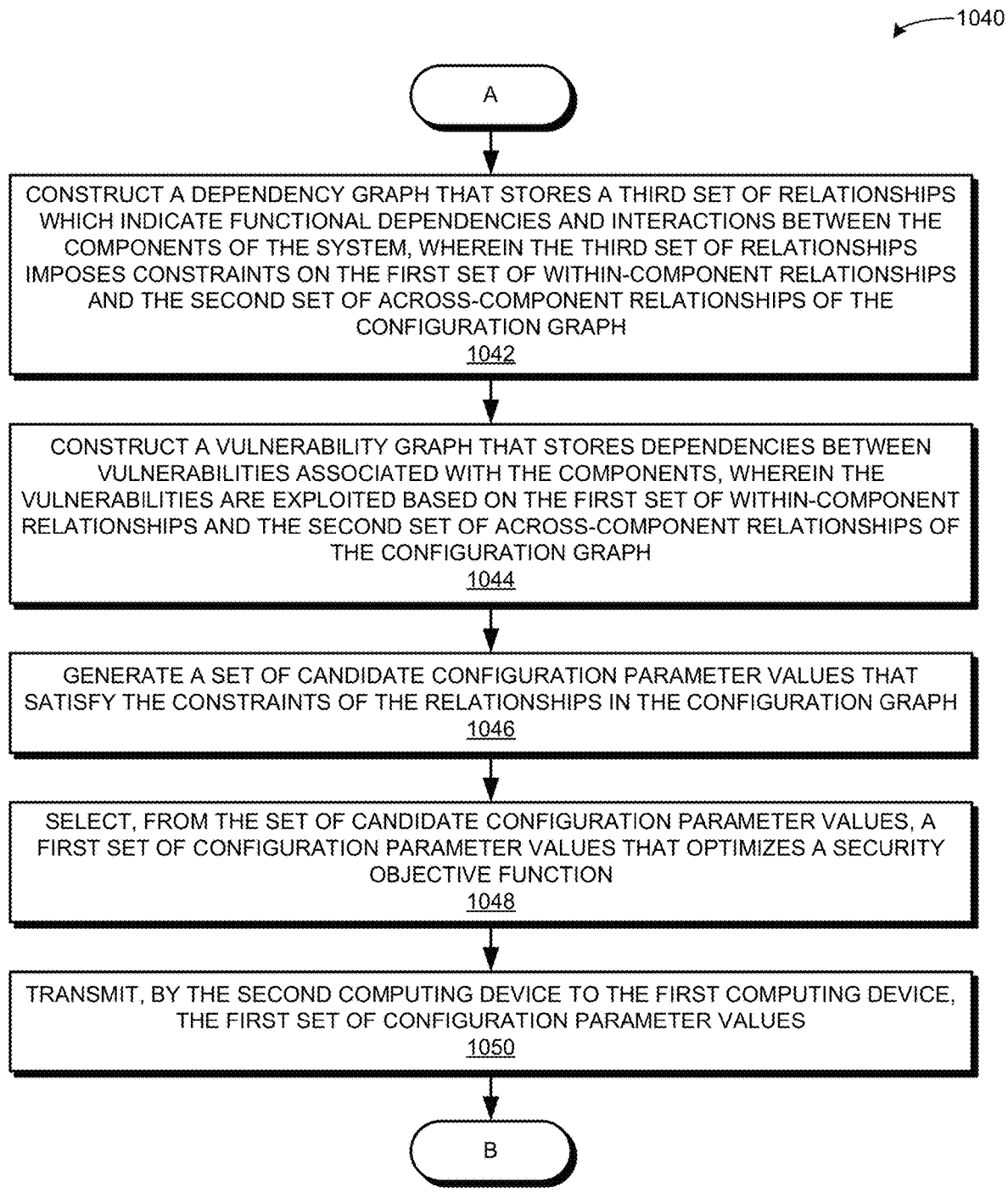
FIG. 10C presents a flow chart illustrating a method for facilitating security in a system of networked components, including user interactions, in accordance with an embodiment of the present application.

FIG. 10C presents a flow chart 1040 illustrating a method for facilitating security in a system of networked components, including user interactions, in accordance with an embodiment of the present application. The system constructs a dependency graph that stores a third set of relationships which indicate functional dependencies and interactions between the components of the system, wherein the third set of relationships imposes constraints on the first set of within-component relationships and the second set of across-component relationships of the configuration graph (operation 1042). The system constructs a vulnerability graph that stores dependencies between vulnerabilities associated with the components, wherein the vulnerabilities are exploited based on the first set of within-component relationships and the second set of across-component relationships of the configuration graph (operation 1044).

The system generates a set of candidate configuration parameter values that satisfy the constraints of the relationships in the configuration graph (operation 1046, similar to operation 1004). The system can solve an optimization problem by using the configuration graph together with the dependency graph and the vulnerability graph. The system can also remove or disable, in a first order, unused dependencies associated with the third set of relationships in the dependency graph. Note that this "first order" can be an optimal ordering for changing each configuration parameter such that the attack surface and the configuration impact are minimized throughout the transition.

The system selects, from the set of candidate configuration parameter values, a first set of configuration parameter values that optimizes a security objective function (operation 1048, similar to operation 1006). The system transmits, by the second computing device to the first computing device, the first set of configuration parameter values (operation 1050). The operation continues as described below at Label B in FIG. 10D.

Figure 10D:
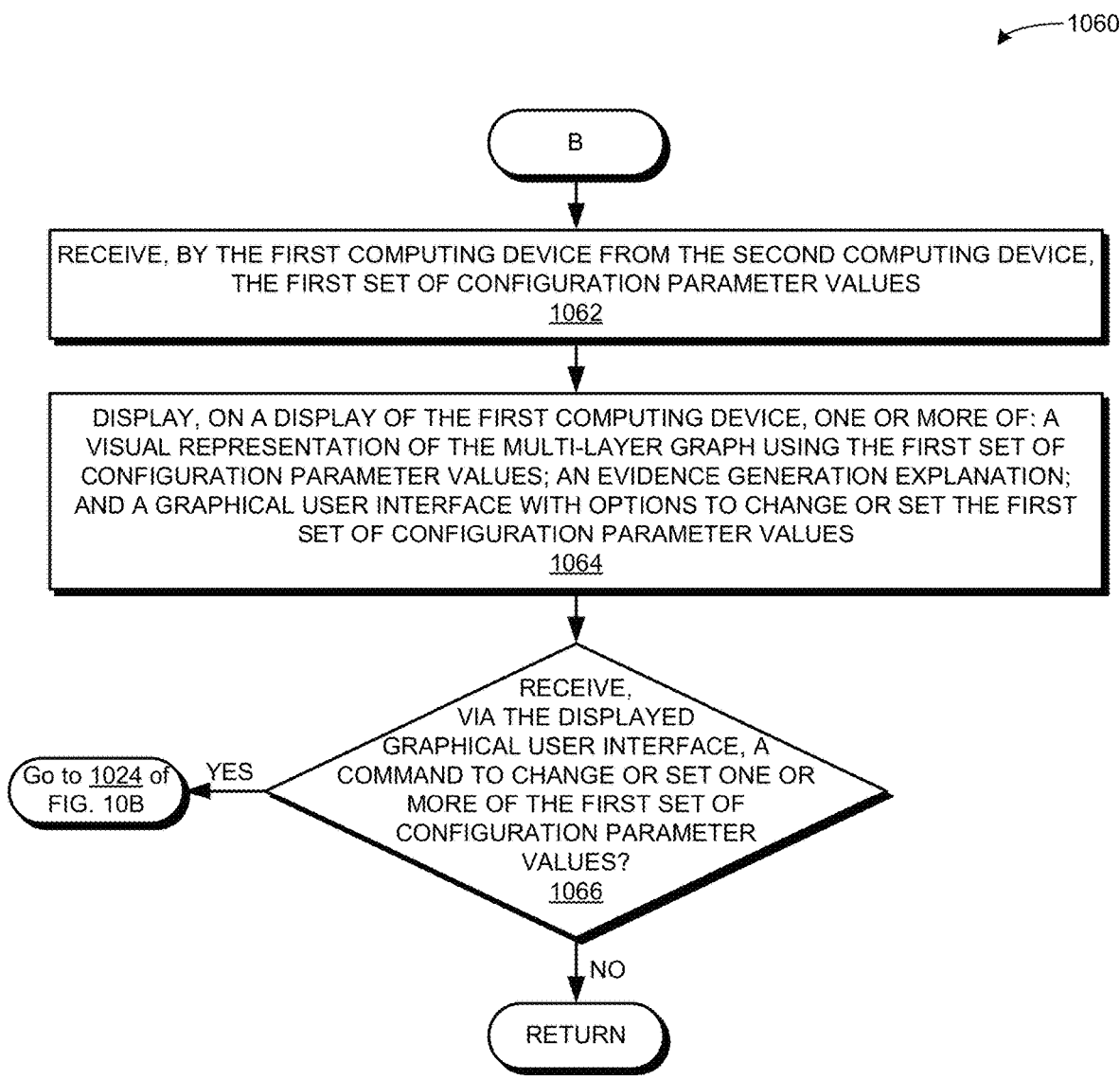
FIG. 10D presents a flow chart illustrating a method for facilitating security in a system of networked components, including user interactions, in accordance with an embodiment of the present application.

FIG. 10D presents a flow chart 1060 illustrating a method for facilitating security in a system of networked components, including user interactions, in accordance with an embodiment of the present application. The system receives, by the first computing device from the second computing device, the first set of configuration parameter values (operation 1062). The system displays, on a display of the first computing device, one or more of: a visual representation of the multi-layer graph using the first set of configuration parameter values; an evidence generation explanation; and a graphical user interface with options to change or set the first set of configuration parameter values (operation 1064). The system can also display a visualization of the first set of configuration parameter values and a newly modified (by the user) set of configuration parameter values. The system can further include in the evidence generation explanation a textual summary of the impact of the newly modified configuration parameter values on both the size of the attack surface and the performance.

If the system does not receive, via the displayed graphical user interface, a command to change or set one or more of the first set of configuration parameter values (decision 1066), the operation returns. If the system receives, via the displayed graphical user interface, a command to change or set one or more of the first set of configuration parameter values (decision 1066), the operation continues at operation 1024 of FIG. 10B.

Thus, by selecting an optimal set of configuration parameter values (as in operation 1048) and by allowing a user to submit changes to the configuration parameter values (as in operation 1024), the system improves the functionality of the computer itself. That is, the embodiments described herein increase the security of the system, and, given the resulting reduced attack surface and the increased performance of the system, can result in an improved and enhanced system which is both less susceptible to attack and more efficient in overall performance.

Exemplary Computer and Communication System

Figure 11:
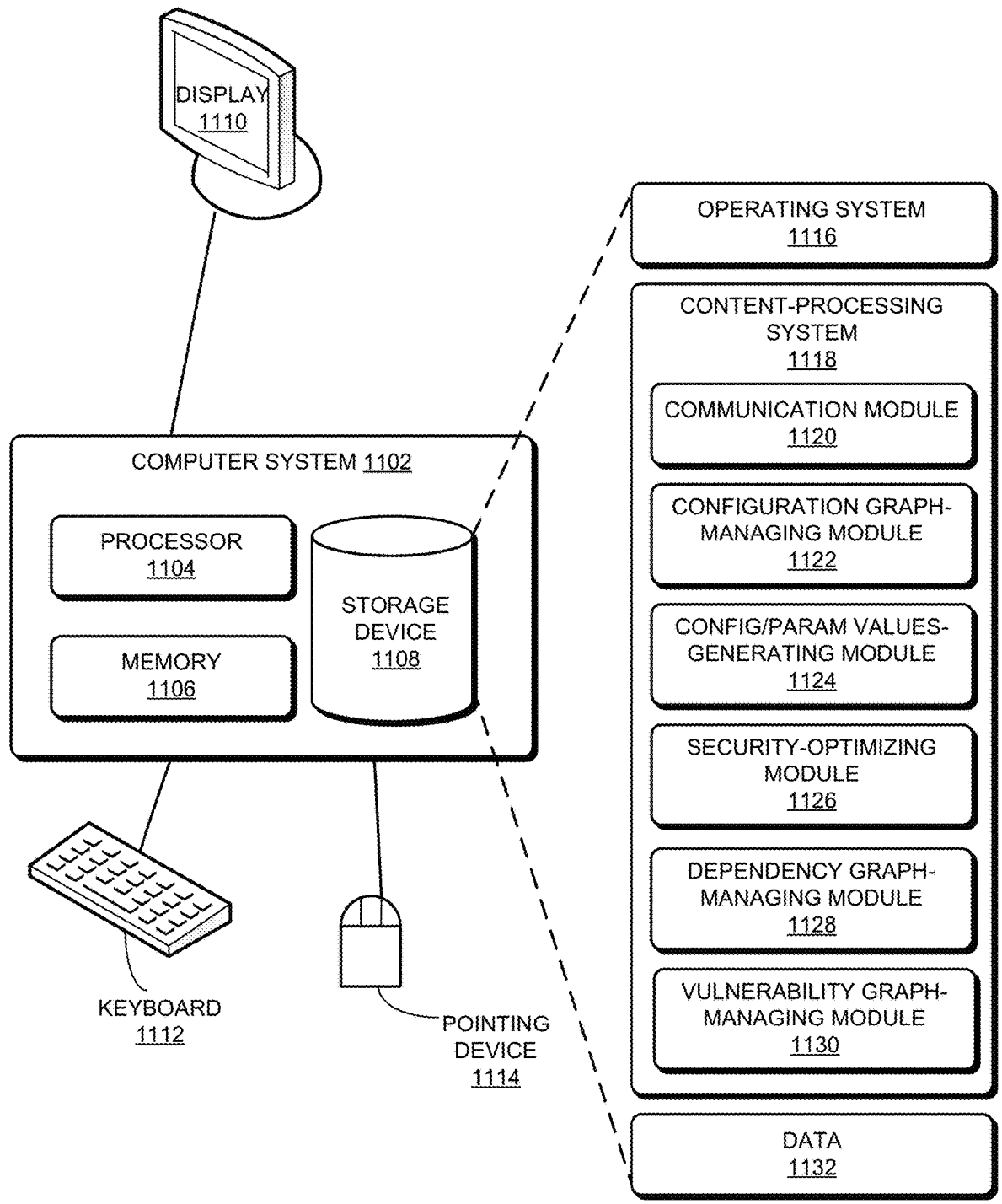
FIG. 11 illustrates an exemplary distributed computer and communication system that facilitates security in a system of networked components, in accordance with an embodiment of the present application.

FIG. 11 illustrates an exemplary distributed computer and communication system 1102 that facilitates security in a system of networked components, in accordance with an embodiment of the present application. Computer system 1102 includes a processor 1104, a memory 1106, and a storage device 1108. Memory 1106 can include a volatile memory (e.g., RAM) that serves as a managed memory, and can be used to store one or more memory pools. Furthermore, computer system 1102 can be coupled to a display device 1110, a keyboard 1112, and a pointing device 1114. Storage device 1108 can store an operating system 1116, a content-processing system 1118, and data 1132.

Content-processing system 1118 can include instructions, which when executed by computer system 1102, can cause computer system 1102 to perform methods and/or processes described in this disclosure. Specifically, content-processing system 1118 may include instructions for sending and/or receiving/obtaining data packets to/from other network nodes across a computer network (communication module 1120). A data packet can include a request, data, a configuration parameter value, and a set of configuration parameter values.

Content-processing system 1118 can further include instructions for constructing a configuration graph that stores a first set of relationships between configuration parameters within a component and a second set of relationships between configuration parameters across different components, wherein a relationship corresponds to a constraint and is indicated by one or more of: a range for a configuration parameter; and a conjunction or a disjunction of logical relationships between two or more configuration parameters (configuration graph-managing module 1122). Content-processing system 1118 can include instructions for generating a set of candidate configuration parameter values that satisfy the constraints of the relationships in the configuration graph (configuration parameter values-generating module 1124). Content-processing system 1118 can include instructions for selecting, from the set of candidate configuration parameter values, a first set of configuration parameter values that optimizes a security objective function (security-optimizing module 1126).

Content-processing system 1118 can also include instructions for constructing a dependency graph that stores a third set of relationships which indicate functional dependencies and interactions between the components of the system (dependency graph-managing module 1128). Content-processing system 1118 can include instructions for constructing a vulnerability graph that stores dependencies between vulnerabilities associated with the components (vulnerability graph-managing module 1130).

Content-processing system 1118 can additionally include instructions for solving an optimization problem by using the configuration graph together with the dependency graph and the vulnerability graph (security-optimizing module 1126). Content-processing system 1118 can include instructions for removing or disabling, in a first order, unused dependencies associated with the third set of relationships in the dependency graph (security-optimizing module 1126).

Content-processing system 1118 can also include instructions for receiving, from a computing device associated with a user, a request to obtain an optimal set of configuration parameter values for the components, wherein the request includes user-configured data (communication module 1120), and for returning, to the computing device associated with the user, the selected first set of configuration parameter values (communication module 1120). Content-processing system 1118 can include instructions for displaying, on a display of the computing device associated with the user, various information, including: a visual representation of the multi-layer graph; the select first set of configuration parameter values, and a visualization of the same; an evidence generation explanation; and a graphical user interface which allows the user to adjust or change any of the selected first set of configuration parameter values (communication module 1120 and security-optimizing module 1126).

Data 1130 can include any data that is required as input or that is generated as output by the methods and/or processes described in this disclosure. Specifically, data 1130 can store at least: data; a configuration graph; a graph which stores a first set of relationships between configuration parameters within a component and a second set of relationships between configuration parameters across different components; a relationship which corresponds to a constraint; a range for a configuration parameter; a conjunction or disjunction of logical relationships between two or more configuration parameters; a set of candidate configuration parameter values; a first set of configuration parameter values that optimizes a security objective function; a security objective function; a security objective function which includes reducing a size of an attack surface of a system of networked components; a security objective function which includes reducing an amount of damage caused by a sequence of attacks that exploit vulnerabilities in the networked components; a Satisfiability (SAT) Solver; a Satisfiability Modulo Theory (SMT) Solver; a node; a plurality of nodes; an edge between nodes; a plurality of edges; a node in a first class which indicates a value for a configuration parameter for a first component; a node in a second class which indicates a relationship between configuration parameters, including the within-component configuration parameters of the first set and the across-component configuration parameters of the second set; a dependency graph; a graph which stores a third set of relationships which indicate functional dependencies and interactions between the components of the system; a vulnerability graph; a graph that stores dependencies between vulnerabilities associated with the networked components; a vulnerability graph whose construction is induced by a set of configuration parameter values; a manual generation involving a user; an automatic generation based on software tools which scan components during operation; an optimization problem; an unused dependency; a request to obtain an optimal set of configuration parameter values for the components; user-configured data; a visual representation of a multi-layer graph using the first set of configuration parameter values, wherein the multi-layer graph comprises the configuration graph, a dependency graph, and a vulnerability graph; the selected first set of configuration parameter values; a visualization of the selected first set of configuration parameter values; a graphical user interface which allows the user to adjust or change any of the selected first set of configuration parameter values; and an explanation of the selected first set of configuration parameter values, including a textual reason for why the selected first set of configuration parameter values solves an optimization problem created by the request.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating security in a system of networked components, the method comprising:
   constructing a configuration graph that stores a first set of relationships between configuration parameters within a component and a second set of relationships between configuration parameters across different components,
   wherein a relationship corresponds to a constraint and is indicated by one or more of:
      a range for a configuration parameter; and
      a conjunction or a disjunction of logical relationships between two or more configuration parameters,
   wherein the configuration graph includes a plurality of nodes, including a first class of nodes and a second class of nodes,
   wherein a node in the first class indicates a value for a configuration parameter for a first component, and
   wherein a node in the second class indicates a relationship between configuration parameters, including the within-component configuration parameters of the first set of relationships and the across-component configuration parameters of the second set of relationships;
   generating a set of candidate configuration parameter values that satisfy the constraints of the relationships in the configuration graph; and
   selecting, from the set of candidate configuration parameter values, a first set of configuration parameter values that optimizes a security objective function.

2. The method of claim 1, wherein the security objective function comprises reducing a size of an attack surface of the system of networked components.

3. The method of claim 1, wherein the security objective function comprises reducing an amount of damage caused by a sequence of attacks that exploit vulnerabilities in the components,
   wherein the vulnerabilities are induced by a respective set of candidate configuration parameter values.

4. The method of claim 1, wherein generating the set of candidate configuration parameter values is based on one or more of:
   a Satisfiability (SAT) Solver; and
   a Satisfiability Modulo Theory (SMT) Solver.

5. The method of claim 1, further comprising:
   constructing a dependency graph that stores a third set of relationships which indicate functional dependencies and interactions between the components of the system,
   wherein the third set of relationships imposes constraints on the first set of within-component relationships and the second set of across-component relationships of the configuration graph.

6. The method of claim 5, further comprising:
   constructing a vulnerability graph that stores dependencies between vulnerabilities associated with the components,
   wherein the vulnerabilities are exploited based on the first set of within-component relationships and the second set of across-component relationships of the configuration graph,
   wherein satisfying the relationship between the configuration parameters in the node in the second class of nodes in the configuration graph results in satisfying a precondition for a vulnerability in the vulnerability graph, and
   wherein each set of candidate configuration parameter values induces constructing a specific vulnerability graph.

7. The method of claim 6, wherein the vulnerability graph and the dependency graph are generated based on one or more of:
   a manual generation involving a user; and
   an automatic generation based on software tools which scan the components during operation.

8. The method of claim 6, further comprising:
   solving an optimization problem by using the configuration graph together with the dependency graph and the vulnerability graph; and
   removing or disabling, in a first order, unused dependencies associated with the third set of relationships in the dependency graph.

9. The method of claim 1, further comprising:
   receiving, from a computing device associated with a user, a request to obtain an optimal set of configuration parameter values for the components, wherein the request includes user-configured data,
   wherein constructing the configuration graph, generating the set of candidate configuration parameter values, and selecting the first set of configuration parameters are in response to receiving the request;
   returning, to the computing device associated with the user, the selected first set of configuration parameter values; and
   displaying, on a display of the computing device associated with the user, one of more of:
      a visual representation of a multi-layer graph using the first set of configuration parameter values, wherein the multi-layer graph comprises the configuration graph, a dependency graph, and a vulnerability graph;

the selected first set of configuration parameter values;
a visualization of the selected first set of configuration parameter values;
a graphical user interface which allows the user to adjust or change any of the selected first set of configuration parameter values; and
an explanation of the selected first set of configuration parameter values, including a textual reason for why the selected first set of configuration parameter values solves an optimization problem created by the request.

10. A computer system for facilitating security in a system of networked components, the system comprising:
a processor; and
a storage device storing instructions that when executed by the processor cause the processor to perform a method, the method comprising:
constructing a configuration graph that stores a first set of relationships between configuration parameters within a component and a second set of relationships between configuration parameters across different components,
wherein a relationship corresponds to a constraint and is indicated by one or more of:
a range for a configuration parameter; and
a conjunction or a disjunction of logical relationships between two or more configuration parameters,
wherein the configuration graph includes a plurality of nodes, including a first class of nodes and a second class of nodes,
wherein a node in the first class indicates a value for a configuration parameter for a first component, and
wherein a node in the second class indicates a relationship between configuration parameters, including the within-component configuration parameters of the first set of relationships and the across-component configuration parameters of the second set of relationships;
generating a set of candidate configuration parameter values that satisfy the constraints of the relationships in the configuration graph; and
selecting, from the set of candidate configuration parameter values, a first set of configuration parameter values that optimizes a security objective function.

11. The computer system of claim 10, wherein the security objective function comprises reducing a size of an attack surface of the system of networked components.

12. The computer system of claim 10, wherein the security objective function comprises reducing an amount of damage caused by a sequence of attacks that exploit vulnerabilities in the components,
wherein the vulnerabilities are induced by a respective set of candidate configuration parameter values.

13. The computer system of claim 10, wherein generating the set of candidate configuration parameter values is based on one or more of:
a Satisfiability (SAT) Solver; and
a Satisfiability Modulo Theory (SMT) Solver.

14. The computer system of claim 10, wherein the method further comprises:
constructing a dependency graph that stores a third set of relationships which indicate functional dependencies and interactions between the components of the system,
wherein the third set of relationships imposes constraints on the first set of within-component relationships and the second set of across-component relationships of the configuration graph.

15. The computer system of claim 14, wherein the method further comprises:
constructing a vulnerability graph that stores dependencies between vulnerabilities associated with the components,
wherein the vulnerabilities are exploited based on the first set of within-component relationships and the second set of across-component relationships of the configuration graph,
wherein satisfying the relationship between the configuration parameters in the node in the second class of nodes in the configuration graph results in satisfying a precondition for a vulnerability in the vulnerability graph, and
wherein each set of candidate configuration parameter values induces constructing a specific vulnerability graph.

16. The computer system of claim 15, wherein the vulnerability graph and the dependency graph are generated based on one or more of:
a manual generation involving a user; and
an automatic generation based on software tools which scan the components during operation.

17. The computer system of claim 15, wherein the method further comprises:
solving an optimization problem by using the configuration graph together with the dependency graph and the vulnerability graph; and
removing or disabling, in a first order, unused dependencies associated with the third set of relationships in the dependency graph.

18. The computer system of claim 10, wherein the method further comprises:
receiving, from a computing device associated with a user, a request to obtain an optimal set of configuration parameter values for the components, wherein the request includes user-configured data,
wherein constructing the configuration graph, generating the set of candidate configuration parameter values, and selecting the first set of configuration parameters are in response to receiving the request;
returning, to the computing device associated with the user, the selected first set of configuration parameter values; and
displaying, on a display of the computing device associated with the user, one of more of:
a visual representation of a multi-layer graph using the first set of configuration parameter values, wherein the multi-layer graph comprises the configuration graph, a dependency graph, and a vulnerability graph;
the selected first set of configuration parameter values;
a visualization of the selected first set of configuration parameter values;
a graphical user interface which allows the user to adjust or change any of the selected first set of configuration parameter values; and
an explanation of the selected first set of configuration parameter values, including a textual reason for why the selected first set of configuration parameter values solves an optimization problem created by the request.

* * * * *